(12) United States Patent
Garner et al.

(10) Patent No.: US 9,497,928 B2
(45) Date of Patent: Nov. 22, 2016

(54) SYSTEM FOR AUTOMATING ANIMAL TESTING PROTOCOLS

(75) Inventors: Joseph P. Garner, Brisbane, CA (US); Michelle Murphy Niedziela, Lansdale, PA (US);
(Continued)

(73) Assignee: PURDUE RESEARCH FOUNDATION, West Lafayette, IN (US)

( * ) Notice: Subject to any disclaimer, the term of this patent is extended or adjusted under 35 U.S.C. 154(b) by 1220 days.

(21) Appl. No.: 13/376,671

(22) PCT Filed: Jun. 8, 2010

(86) PCT No.: PCT/US2010/037834
§ 371 (c)(1),
(2), (4) Date: Apr. 6, 2012

(87) PCT Pub. No.: WO2010/144494
PCT Pub. Date: Dec. 16, 2010

(65) Prior Publication Data
US 2012/0180731 A1    Jul. 19, 2012

Related U.S. Application Data

(60) Provisional application No. 61/184,960, filed on Jun. 8, 2009.

(51) Int. Cl.
*A01K 1/03* (2006.01)
*A01K 29/00* (2006.01)

(52) U.S. Cl.
CPC ............. *A01K 1/031* (2013.01); *A01K 29/005* (2013.01)

(58) Field of Classification Search
CPC ............ A01K 1/03; A01K 1/031; A01K 1/00; A01K 1/0041; A01K 1/032; A01K 29/005
(Continued)

(56) References Cited

U.S. PATENT DOCUMENTS 2,309,893 A * 2/1943 Gersbach ................ E06B 11/08
49/46
3,687,110 A * 8/1972 Braunhut ............. A01K 67/033
119/421
(Continued)

FOREIGN PATENT DOCUMENTS

| WO | WO 2005/008141 | 1/2005 |
| WO | WO 2005/067703 | 7/2005 |
| WO | WO 2006/121222 | 11/2006 |

OTHER PUBLICATIONS

International Search Report for PCT/US2010/037834, Nov. 4, 2012.
International Preliminary Report on Patentability for PCT/US2010/037834, Dec. 12, 2011.

*Primary Examiner* — Thien Thanh Pham
(74) *Attorney, Agent, or Firm* — Brinks Gilson & Lione

(57) ABSTRACT

In one aspect, the present invention provides a housing system for conducting high throughput animal experiments. The housing system includes a home cage, at least one rotatable turnstile enclosed by housing to form two or more isolation chambers, a means for animal identification, and one or more action stations functionally coupled to one or more isolation chambers. The turnstile includes a plurality of one or more separation members rotatable about a vertical axis, each isolation chamber bounded by one or more separation members. The action stations contain one or more devices facilitating completion of at least one animal-directed or experimenter-initiated action. In a preferred embodiment, the home cage is sufficiently sized to house a (Continued)

plurality of small animals, such as mice. Tunnel passageways may be connected to the home cage, including one or more tunnel passageways containing a rotatable turnstile. Additional embodiments include rotatable turnstiles, rotatable turnstile assemblies, and methods of conducting high throughput animal experiments using the devices and systems described herein.

15 Claims, 18 Drawing Sheets

(75) Inventors: Edward A. Fox, West Lafayette, IN (US)

(58) Field of Classification Search
USPC .............................. 119/416–421, 473; 49/46
See application file for complete search history.

(56) References Cited

U.S. PATENT DOCUMENTS

| | | | |
|---|---|---|---|
| 4,167,152 A * | 9/1979 | Mills ............................. | 119/416 |
| 4,448,150 A | 5/1984 | Catsimpoolas | |
| 5,146,711 A * | 9/1992 | Gallenschutz .......... | E06B 11/08 49/35 |
| 5,186,122 A * | 2/1993 | Phillips .................... | A01K 1/03 119/474 |
| 7,104,008 B2 * | 9/2006 | Yokotachi ........................ | 49/42 |
| 2006/0160484 A1 | 7/2006 | Falk | |
| 2008/0110093 A1* | 5/2008 | Liles ....................... | E05G 5/003 49/42 |

* cited by examiner

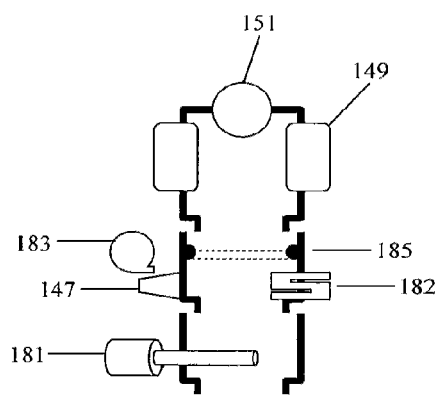
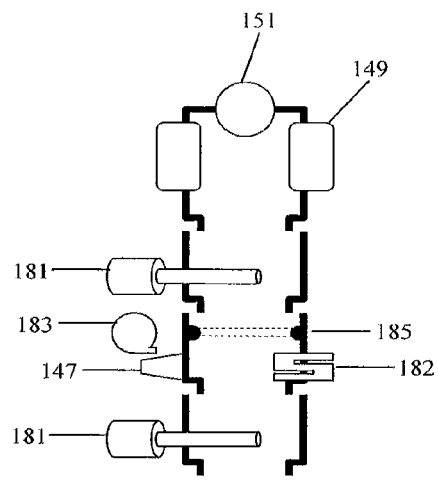
FIG. 16a
FIG. 16b
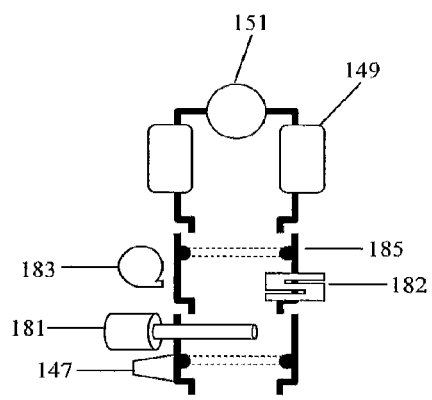
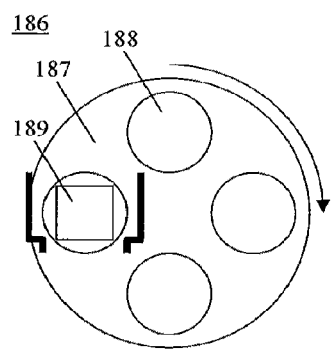
FIG. 16c
FIG. 16d

SYSTEM FOR AUTOMATING ANIMAL TESTING PROTOCOLS

This application is a National Stage application of International Application No. PCT/US2010/037834 filed Jun. 8, 2010, which claims the benefit of U.S. Provisional Application No. 61/184,960, filed Jun. 8, 2009, the entire contents of which are hereby incorporated herein by reference.

RELATED APPLICATIONS

This application claims the benefit of the filing date under 35 U.S.C. §119(e) of Provisional U.S. Patent Application Ser. No. 61/184,960, filed Jun. 8, 2009, which is hereby incorporated by reference.

BACKGROUND

Conventional mouse experiments are hampered by at least three factors. First, most experiments involve humans handling mice. As humans are a mouse predator, this means that data from laboratory mice is inherently tainted by the stress and fear responses inherent in the measurement procedures. Secondly, because many experiments involve labor-intensive data collection from the mice, most mice are only generating useful data for a very small portion of the day. In the case of behavioral experiments a further confound is often that data are taken during daylight hours when a mouse would normally be asleep. Further, experiments involving continuous data collection (such as feeding behavior) require animals to be singly housed, which is a further confounding source of stress; or they require only one data-generating animal per group (e.g. telemetry) which needlessly increases the number of animals housed. Lab mouse environments are typically unnatural, and typically present mice with a broad array of stimuli which in the wild would signal a threat to survival or reproduction; or which disrupt cues or sensory signals essential to normal mouse physiology and behavior (Olsson & Dahlborn 2002; Sherwin 2002; Latham & Mason 2004).

Environmental enrichments include changes in cage design, cage furniture, bedding, husbandry, or other aspects of animal care, that may facilitate normal behavior and allow animals to, for example, regulate and control stressors in their environment (Olsson & Dahlborn 2002; Garner 2005). Enrichments may improve, for example but not limited to, the welfare of laboratory animals, and the quality of scientific data they provide (Würbel 2001; Olsson & Dahlborn 2002; Garner 2005).

A naturalistic system, such as a housing or experimental capture system, is disclosed which may, among other things, provide a general system for the feeding, census taking, daily monitoring (through photographs, temperature, weight, etc), and capture, if necessary, of mice, rabbits, dogs, primates, and other laboratory animals, with limited to no human intervention. This system may also be adapted to a wildlife or zoo environment. Although mice are discussed herein, the system is not limited to and may be adapted to other animals, birds, reptiles, and etc.

There are many ways in which feeding behavior may be studied, ranging from the general, such as total 24-hour food intake, to the specific, such as meal analysis (Ravussin & Bouchard 2000). Meals are considered the functional units of ingestion. The parameters measured in meal pattern analysis may include, but are not limited to, meal frequency, meal duration, meal size and the inter-meal interval. By contrast, microstructure analysis of ingestive behavior, may examine, among other things, the licks, bites, and chews of a meal (Kissileff 2000).

Techniques for analyzing the meal patterns and microstructure of food intake may, for example, feed animals using automated food dispensers, which may give precise measurements of pellet or liquid food (Davis 1989; Kissileff 2000). These precise, in-depth measurements may extend the findings of meal patterns and the microstructure of meals, give a better idea of how ingestive behavior occurs, develop the relationships between meal number and hunger or meal duration and satiation, and provide evidence of motivational processes, such as appetite, and the underlying mechanisms of feeding behavior (Smith 2000; Strubbe & Woods 2004).

These techniques typically rely on the social isolation of each animal to ensure that the identity of each animal feeding from the automatic feeder is known. When animals are studied under situations fundamentally different from their natural conditions the external validity of the results may be limited (Würbel 2000; Würbel 2001), for example, because the stress of social isolation may affect the animal's physiology and hence its feeding behavior. For instance, socially isolated rats gain less weight than group housed rats, as well as showing many other signs of stress (Perello et al. 2006).

Few physiological variables in animals are unaffected by stress (Moberg & Mench 2000), and psychological components of a stressor can ultimately determine the magnitude of its impact (Weiss 1971). Indeed, the breadth of systems affected by stress is neatly illustrated by the breadth of measures taken in stress studies, from hormonal titers, to heart rate, to immune function, to gross organ weights, to abnormal behavior (e.g. Hurst et al. 1999). Handling itself is a stressor, animals differ greatly in response to handling, and experimenters differ greatly in their handling styles. As a result, interactions between the animal and the experimenter add a great deal of noise to experimental outcomes, which, mediated by stress responses can potentially affect a wide variety of experimental outcomes. Experimenters themselves may be a source of experimental noise in many mouse experiments (e.g. Chesler et al. 2002). Accordingly, handling or experimenter can markedly affect the outcome of a wide variety of experiments (e.g. Andrews & File 1993; Ryabinin et al. 1999; Chesler et al. 2002; Gariepy et al. 2002; Chou-Green et al. 2003; Hale et al. 2003; Sternberg & Ridgway 2003; Bayne 2005).

This present invention addresses the above-described problems and limitations by providing methodologies aimed at reducing experimental variability or bias introduced by differences between experimenters in their handling of animals and in the way they take measurements, thereby reducing or eliminating much of the variability introduced by differences between animals in the degree of their stress response in response to being handled for experimental procedures.

SUMMARY

In one aspect, the present invention provides a housing system for conducting high throughput animal experiments. The housing system includes a home cage, at least one rotatable turnstile enclosed by housing to form two or more isolation chambers, a means for animal identification, and one or more action stations functionally coupled to one or more isolation chambers. The turnstile includes a plurality of one or more separation members rotatable about a vertical axis, each isolation chamber bounded by one or more separation members. The action stations contain one or more devices facilitating completion of at least one animal-directed or experimenter-initiated action. In a preferred embodiment, the home cage is sufficiently sized to house a plurality of small animals, such as mice. Tunnel passageways may be connected to the home cage, including one or more tunnel passageways containing a rotatable turnstile.

In another aspect, a housing system for conducting high throughput animal experiments includes a home cage and at least one tunnel station containing at least one chamber. The tunnel station is directly linked to a home cage or to a tunnel passageway, which is directly or indirectly connected to the home cage. The tunnel station is configured to allow entry of a single small experimental animal at a time, whereby the tunnel station contains an automated animal identification means and at least one additional means selected from the group consisting of automated animal detection means, automated means for providing a solid composition, automated means for providing a liquid composition, automated means for providing a reward, automated means for providing a punishment, automated means for recording one or more animal measurements, automated means for animal imaging, automated stimulus presentation means, automated means for compound tactile stimulus presentation, and combination thereof.

In another aspect, a method for conducting a high throughput animal experiment includes (1) providing a housing system in accordance with the present invention, the housing system comprising a plurality of passageways configured to allow experimental animals to exit and return back to the home cage, the plurality of passageways comprising at least one rotatable turnstile enclosed by housing to form two or more isolation chambers functionally linked to a plurality of action stations or passageways, the system further comprising an animal identification means, wherein the plurality of passageways and rotatable turnstiles are configured so that an animal must be identified and pass through at least one rotatable turnstile before returning to the home cage; (2) populating the system with a plurality of experimental animals; (3) allowing at least one test animal to exit from the home cage and become identified, whereupon passage through the rotatable turnstile(s) the test animal passes through additional stations configured based upon the identification of the test animal to provide food, provide drink, provide medication(s), provide a potentially toxic test substance, provide a reward, provide a punishment, execute a physiological measurement, generate a photographic, videographic, thermographic, or fluorescent image of the test animal, subject the test animal to one or more stimuli, or combination thereof.

BRIEF DESCRIPTION OF THE DRAWINGS

FIG. 16 depicts alternative tunnel stations embodiments (15a-15c), including the use of feces urine collection system (15d).

DETAILED DESCRIPTION

In one aspect, the present invention provides a high-efficiency, high-welfare, naturalistic housing platform for mice reflecting a fundamental redesign of mouse housing, which attempts to address, among other things, minimizing human-mouse contact, and maximizing the mouse's perceived control over its environment. The system described herein minimizes human-animal interference by automating many procedures that would involve human interference with the animals, thereby minimizing stress on lab mice, and improving the quality of scientific data. In particular, this system allows the brief isolation of individual mice for automatic data collection, including around-the-clock data generation from all animals, including individual-animal data from group-housed animals; automatic treatment applications; and engineering the movement(s) of animals between cages or into holding pens without human interference. By minimizing human-animal interference without requiring permanent isolation housing during the study, the system can remove or reduce the effects of social deprivation on, for example, stress physiology, body weight, and other variables, which may otherwise confound the results of the experiment.

The housing system described herein solves many of the above-described problems by providing a platform enabling (among others) automating the census-keeping of a population of animals (such as mice) in a cage; automating the measurement of basic biometric, activity and physiological data; automating the recording of feeding and drinking behavior; automating complex behavioral and psychological tasks that would normally be performed in a maze or a skinner box; enabling the efficient removal and handling of mice from the cage where automated measurements meet a predetermined profile, and automating the feeding of complex dietary regimens or administration of complex drug regimens to small experimental animals, such as mice.

In one aspect, the present invention provides a housing system for conducting high throughput animal experiments. The housing system includes a home cage, at least one rotatable turnstile enclosed by housing to form two or more isolation chambers, a means for animal identification, and one or more action stations functionally coupled to one or more isolation chambers. The turnstile includes a plurality of one or more separation members rotatable about a vertical axis, each isolation chamber bounded by one or more separation members. The action stations contain one or more devices facilitating completion of at least one animal-directed or experimenter-initiated action. In a preferred embodiment, the home cage is sufficiently sized to house a plurality of small animals, such as mice. Tunnel passageways may be connected to the home cage, including one or more tunnel passageways containing a rotatable turnstile.

Figure 1:
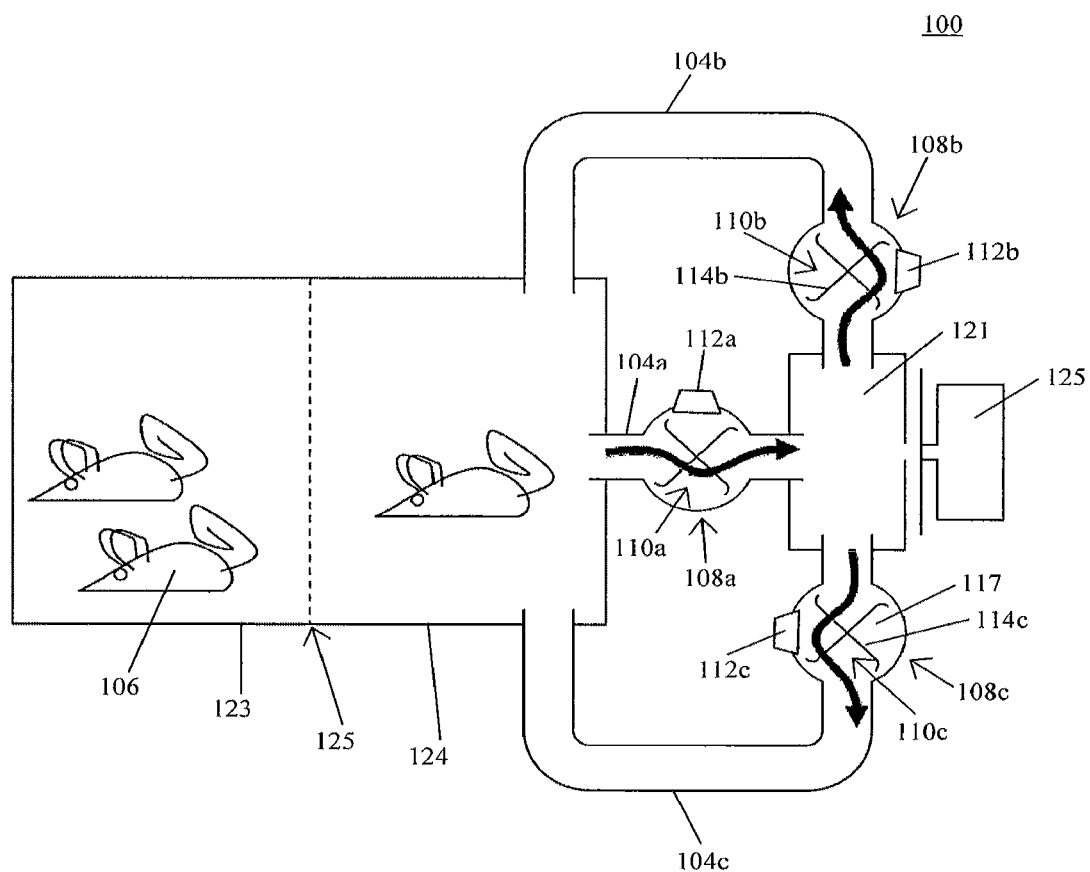
FIG. 1 depicts a simple housing system according to one aspect of the present invention.

A simple exemplary housing system 100 embodiment is depicted in FIG. 1. In FIG. 1, a home cage 102 is interconnected by three tunnel passageways 104a, 104b, 104c, each tunnel passageway 104 connected to a separate rotatable turnstile assembly 108a, 108b, 108c. A rotatable turnstile assembly 108 may be functionally coupled to the home cage 102, through which animals or small animals, such as mice 106 pass in the course of their normal foraging behavior to gather food. As the animal pushes the turnstile 110a, 110b, 110c, lockable isolation chambers 117 may be created which can temporarily keep the animal or mouse 106 in the isolation chamber 117 for hands-free automation of a wide variety of animal-directed or experimenter-initiated action. The actions include measurement of various behavioral and physiological parameters, presentation of stimuli, automatic dispensing of pre-determined food, drink, drugs, rewards, punishments, in pre-determined amounts to specific animals, depending on their identification, etc. (as further described herein).

The nature of the actions in a given isolation chamber 117 may be defined by a "station" 112 allowing or promoting execution of one or more actions, whereby "actions" may refer to animal-initiated actions, such as feeding or drinking, or experimenter-initiated actions, typically automated tasks associated with animal identification and physiological measurements. Stations 112 may be positioned in one or more turnstile chambers 117 or tunnel stations 128 functionally coupled to the home cage 102. Typically, a station 112 may includes one or more devices facilitating completion of an animal-initiated or experimenter-initiated action. The system 100 may include stations 128 positioned in one or more turnstile chambers 117, one or more tunnel stations 128, or combination thereof.

A turnstile 110 may include one or more separation members 114 configured to rotate about a vertical axis. Separation members 114 may be connected to each other directly, or they may be connected to a rotatable shaft 118 defining a vertical axis. In the exemplary embodiment depicted in FIG. 2, the turnstile 110 includes a plurality of separation members 114 connected to a rotatable shaft 118, the rotatable shaft 118 being connected to housing, as further depicted in, for example, FIG. 6 below. When used in conjunction with the housing 130 described herein, the separation members 114 define one or more isolation chambers 117, each isolation chamber 117 being bounded on opposite sides by one or more separation members 114. In a preferred embodiment, the separation members 114 (and/or housing) may be configured to define a three dimensional space or isolation chamber 117 sized to enclose or accommodate a single small animal of a given type on the base, but having a sizing generally excluding entry by additional animals of that type following rotational movement of the turnstile by the single small animal, as well as excluding entry of human adult subjects.

Figure 2:
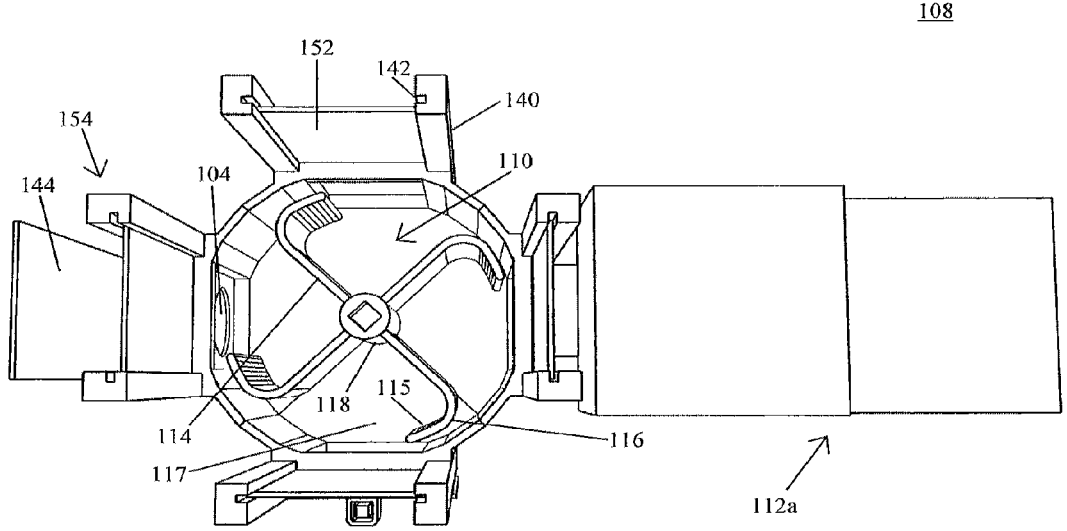
FIG. 2 depicts a top view of an exemplary turnstile assembly without the ceiling.

In one embodiment depicted in FIG. 2, for example, the turnstile 110 may include a plurality of separation members 114, each separation member 114 having a substantially planar unitary form, such as a vane or door. In another embodiment, the turnstile 110 may include a plurality of separation members 114 in the form of bars or rods on opposite sides of an isolation chamber 117, the bars or rods having any suitable cross-sectional shape (not shown). Accordingly, the separation members 114 may be arranged, for example, in a plurality of parallel-spaced bars or rods, a lattice or network of bars or rods, or any other arrangement of bars or rods sufficient to restrict an animal 106 to a particular isolation chamber 117.

Figure 3:
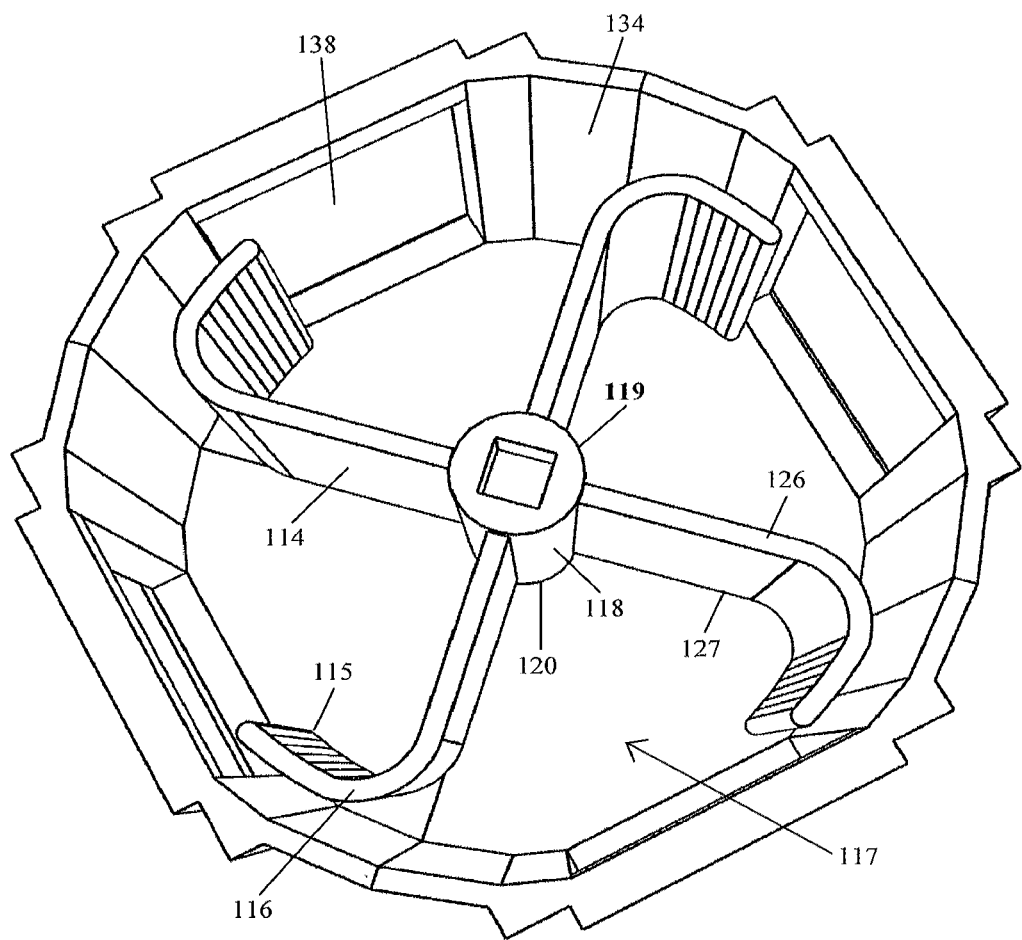
FIG. 3 shows an expanded view of a turnstile assembly portion depicted in FIG. 2.

FIG. 2 depicts a turnstile 110 formed from a plurality of separation members 114 in the form of vanes rotatable about a vertical axis. Separation members 114 may be directly connected to each other, or they may be connected to a rotatable shaft 118 as shown in FIG. 3, whereby the separation members 114 or vanes extend radially outward from the shaft 118 substantially the same distance and terminating at distal ends 115. A separation member may have curved distal end portions 116, as exemplified by the vanes in FIG. 3. Further, each separation member 114 or vane may contain a curved distal end portions 116 configured so that upon rotation of the turnstile 110, the curved distal ends 115 and/or distal end portions 116 define a circumferential three dimensional space having a circular horizontal cross-section. In preferred embodiments, when the separation member(s) 114 are rotated, their distal ends 115 or distal end portions 116 define a cylindrical surface whereby separation members 114 bounded by a plane defined by the top boundary 115 of the separation member(s) 114 and by a plane defined by the bottom boundary 116 of the separation member(s) 117 (see FIG. 7) define a three dimensional space sized to enclose a single small animal 106, such as a rodent, for example, but to exclude additional small animals of the same type (including rodents) or single human adults.

Figure 4:
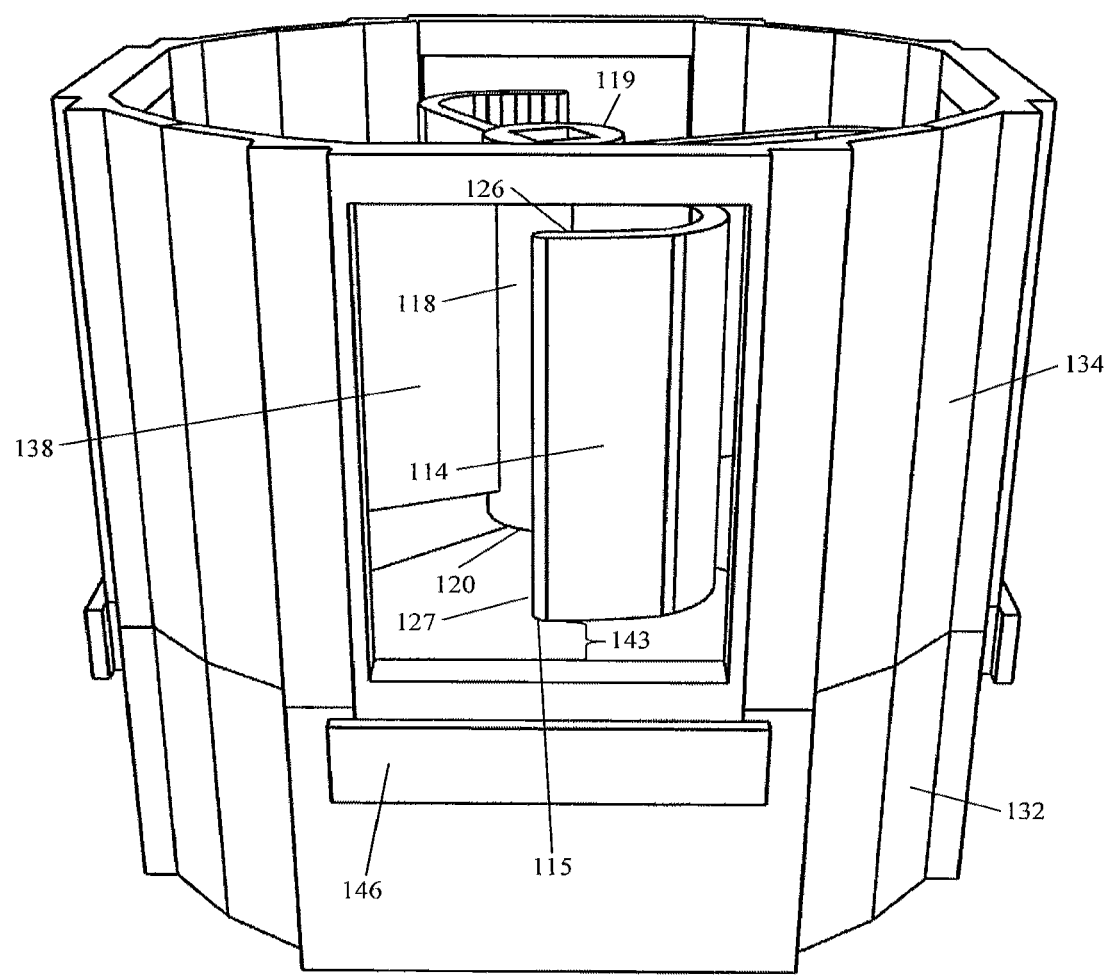
FIG. 4 depicts a side view of a turnstile assembly without the ceiling or associated action stations.

FIG. 4 depicts a turnstile 110 having four vanes 114, however, a turnstile 110 may have any number of separation members 114 (including 1, 2, 3, 4, 5, 6, 7, 8, or more) sufficient for forming isolation chambers 117 capable of temporarily holding an animal 106 therein. Further, the separation members 114 or vanes may be formed from a variety of different materials, including plastic, metal, or combinations thereof.

In preferred embodiments, the action stations 112 are positioned in one or more turnstile chambers 117, wherein animal actions or experimenter-initiated tasks are completed in specified turnstile chambers in a defined temporal sequence. Following entry into a given action station 112 in a given turnstile chamber 117, the turnstile 110 may be locked under computer control, preventing movement to subsequent chambers 117 or stations 112 until a predetermined period of time has passed, or until one or more actions or tasks have been completed, or both, as desired.

Figure 13:
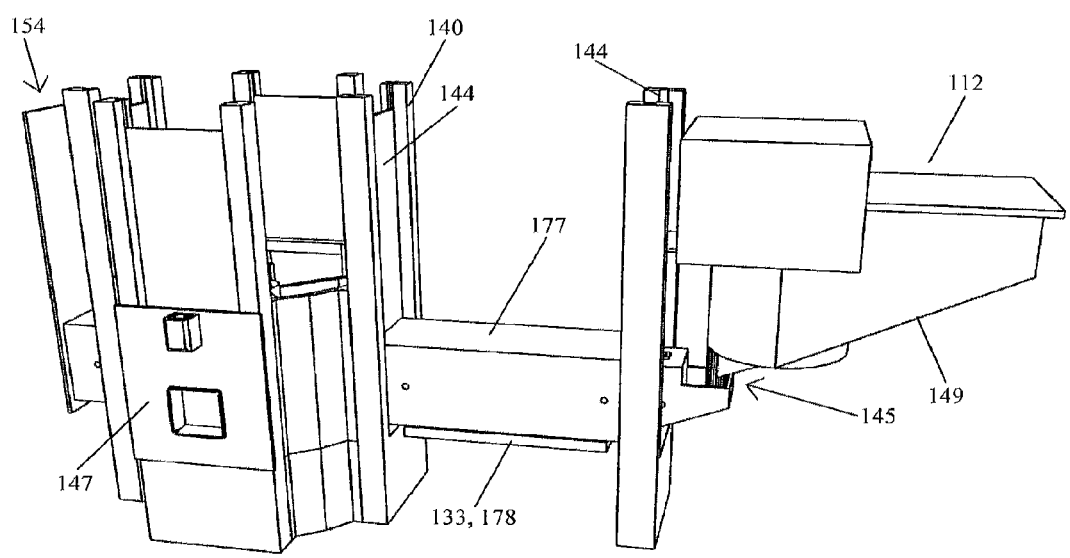
FIG. 13 depicts an alternative turnstile assembly incorporating the floating floor weigh station depicted in FIG. 12.

Importantly, the high throughput housing system 100 is designed to restrict access to only one animal 106 at a time in any given action station 112. This ensures that actions executed in a given station 112 can be tracked to a specifically identified animal 106. Thus, in preferred embodiments the system 100 is configured using suitably designed routing schemes employing suitably placed turnstile assemblies 108, tunnel stations 128 (as further discussed in FIGS. 13 and 14 below) and/or one one-way passageways (using suitable closing devices, for example), to ensure that an animal 106 exits the home cage 102 in a predetermined tunnel passageway sequence in which specific identification of an animal 106 in an animal identification station 112, for example, can be linked to additional tasks or actions executed by that animal 106 prior to or following identification.

Exemplary action stations 112 include, for example, identification stations, feeder stations, measurement stations, including weigh stations, physiological measurement stations, feces/urine collection stations, and other stations further described below. Typically, an action station 112 includes a "trapping" mechanism or other suitable structural configuration to ensure access to the action station 112 by only one animal 106 at a time.

The housing system 100 may include a rotatable turnstile 110 and/or rotating turnstile assembly 108. More particularly, the home cage 102 may include a rotatable turnstile 110 and/or rotating turnstile assembly 108, or it may be connected to a rotating turnstile assembly 108 via one or more passageways 104 directly or indirectly connected thereto. In a given rotating turnstile assembly 108, each isolation chamber 117 may be structurally configured for connective linkage to an action station 112, an open tunnel passageway 104, a tunnel station 128, tunnel station plate 129, or closing wall (or blank) 152.

The present invention provides a variety of exemplary rotating turnstile assemblies 108. FIGS. 2-13 depict a variety of rotatable turnstile assemblies and portions thereof. In one embodiment, the present invention provides a rotating turnstile assembly 108, including a rotatable turnstile 110 enclosed by housing 130 to form two or more isolation chambers 117, the housing 130 comprising a base 132, walls 134, and a ceiling 136, wherein each of the base 132 and ceiling (or roof) 136 are connectively linked to the turnstile 110 and the walls 134 (see FIGS. 2, 5, 6, for example). Further, either one or both of the base 132 and ceiling 136 may be configured to provide a pivot for rotating the turnstile 110 about a vertical axis, wherein the walls 134 laterally extend around the turnstile 110, the walls 134 comprising one or more open regions 138 configured for connective engagement to one or more action stations 112 or system passageways 104. A turnstile assembly 108 may include any one of the turnstiles 110 described herein.

Figure 5:
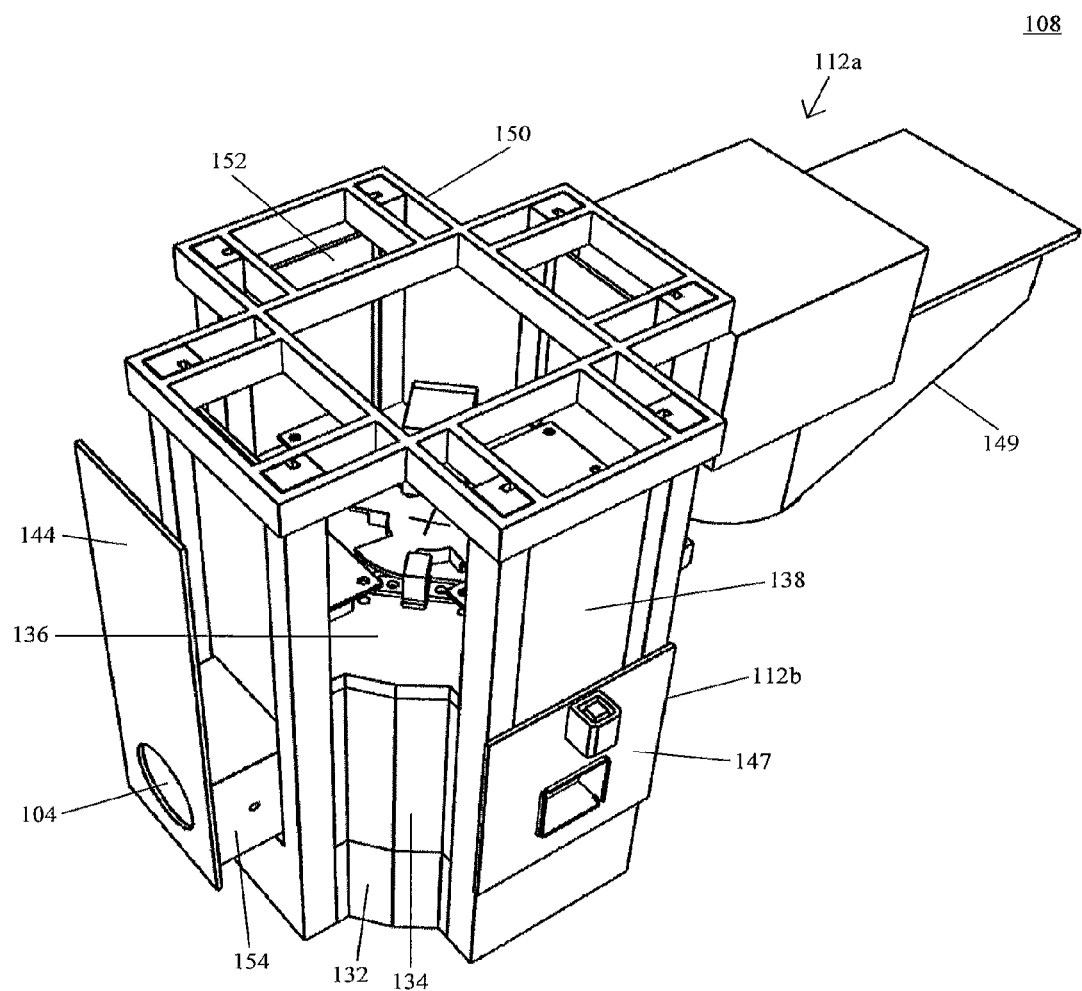
FIG. 5 depicts a perspective view of the full turnstile assembly corresponding to FIG. 2, including a ceiling and locking clip.
Figure 6:
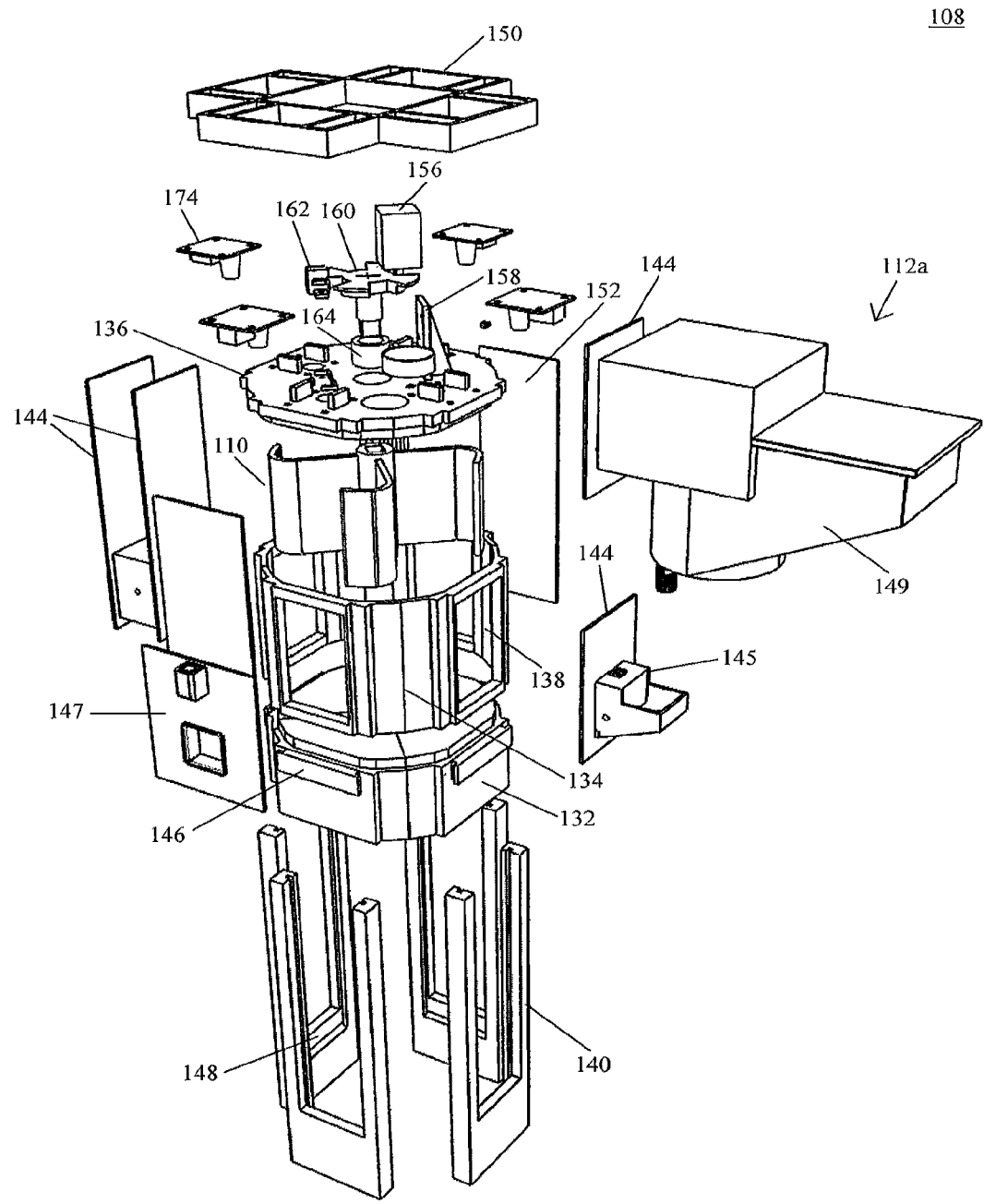
FIG. 6 depicts an exploded view of the embodiment depicted in FIG. 5.
Figure 7:
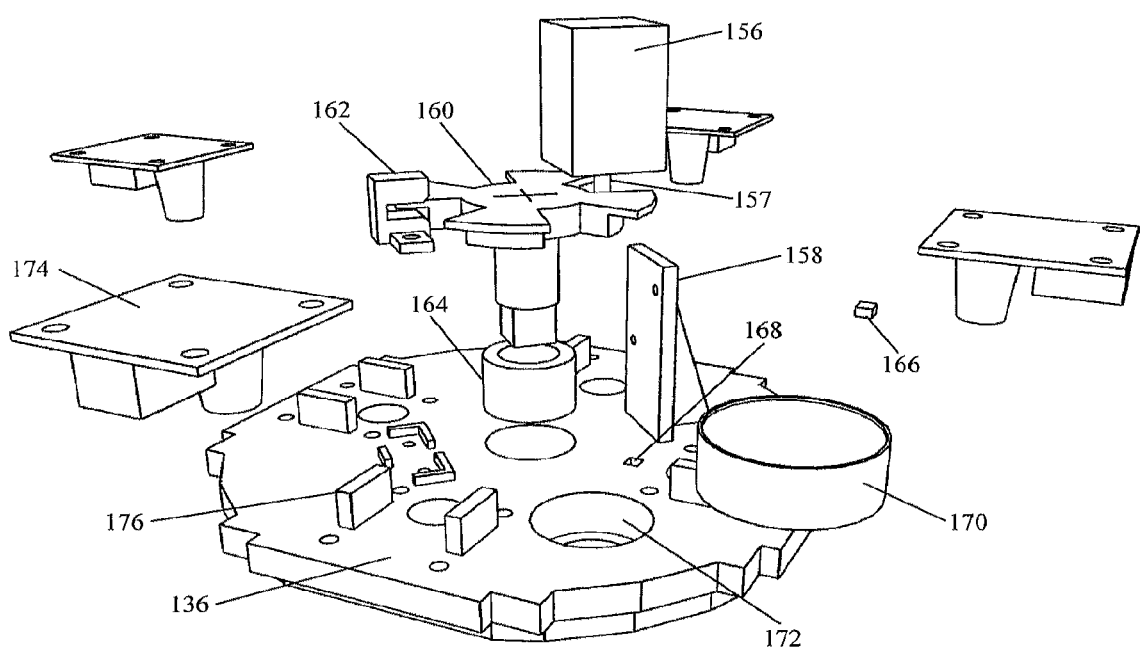
FIG. 7 depicts an expanded view of the roof assembly depicted in FIG. 6.

A portion of an exemplary rotating door assembly 108 (taken from above without the ceiling) is shown in FIGS. 2 and 3. FIG. 3 shows a top view of a portion of the assembly 108 depicted in FIG. 2, emphasizing the turnstile 110 and walls 134. FIG. 4 depicts a side view of the assembly portion depicted in FIG. 3. FIG. 5 depicts a perspective view of the assembly depicted in FIG. 2. FIG. 6 depicts an exploded view of the embodiment depicted in FIG. 5. FIG. 7 depicts an expanded view of the roof assembly depicted in FIG. 6.

In the embodiments depicted in FIGS. 2-7, the rotating turnstile assembly 108 includes a turnstile 110 containing a plurality of separation members (depicted as vanes) 114 connecting to a rotatable shaft 118. Base 132 (or floor) and ceiling 136 portions are connectively linked to terminal ends 119, 120 of the central shaft 118. In addition, walls 134 laterally extend around the turnstile 110, further joining the base 132 and ceiling 136 to the turnstile 110. The walls 134 contain one or more open regions 138 (FIGS. 3 and 4) for functional and/or connective engagement to one or more action stations 112 or system passageways 104 as shown in FIGS. 5 and 6, for example. FIGS. 5 and 6 depict a feeder station 112a and an identification station 112b, which are further described below. A feeder station 112a includes a feed hopper 145 and one or more feeders 149. The identification station 112b includes an RFID tag reader 147 further described below. Further, as shown in FIGS. 2 and 6, grooved guides 140 may be connected to the base 132, walls 134, ceiling 136, and other equipment that needs to be held in registration to the base 132. The grooved guides 140 contain slotted regions or grooves 142 for slotted attachment to one or more action stations 112, action station face plates 144, open tunnel passageways 104, or closing walls (or blanks) 152. Action stations 112 may be configured with pairs of face plates 144 on opposite ends, the face plates functioning as "adaptors" facilitating slotted attachment between two consecutively positioned guides corresponding to two different turnstile assemblies 108 as further shown in FIG. 13. In FIG. 2 and Further, the base 132 may include flanges 146 for engaging the grooved guides 140, while the grooved guides 140 contain a ledge 148 facilitating slotted attachment to the base 132. A locking clip 150 may be used to secure linkage and stabilization of the connection between the guides 140, base 132, walls 134, ceiling 136, and one or more action stations 112 (FIGS. 5, 6). The combination of grooved guides 140, ledges, sliding face plates 144, and locking clips 150 allow for modular snap-together assembly of a wide variety of assemblies 108 and/or housing systems 100 by simple and convenient slidable attachment of component parts.

Either one of the base 132, ceiling (or roof) 136, or both may provide a pivot for the turnstile 110 rotating about the vertical axis and/or shaft 118. Separation members 114 in the turnstile 110 form partitions creating a plurality of chambers 117, as shown in FIGS. 2 and 3, for example.

Preferably, the turnstile is designed to optimize clearance between the walls, ceiling, and floor, and to ensure that animal bodily portions, such as mouse tails, do not get caught by the rotating turnstile 110. Accordingly, when operating the turnstile 110 counterclockwise, it may be advisable to curve or sweep back the separation members or vanes back in a direction opposite to the direction of rotation. When swept back in this manner, the separation member ends can block access to the isolation chambers 117 or action stations 112 when the turnstile 110 has not fully rotated into position and can enhance the space for maintaining a rodent tail without getting caught by the rotating turnstile 110. FIG. 4 depicts a portion of a turnstile assembly 108 illustrating an animal clearance space between the distal ends of the separation members 114 (or vanes) and the surrounding walls 134.

As shown in FIG. 7, the roof 136 of the assembly 108 may house multiple functional parts, including those associated with means for locking the turnstile in register with a given isolation chamber, means for identifying the rotational position of the turnstile, and means to ensure unidirectional rotation of the turnstile. Thus, for example, FIG. 7 depicts a locking solenoid 156 connected to a solenoid mount 158 for locking the turnstile.

A rotatable turnstile assembly 108 is preferably configured to facilitate lockable engagement between any one of a plurality of isolation chambers 117 and one or more action stations 112 connectively linked thereto. More particularly, the rotatable turnstile assembly 108 may include means to lock the turnstile in register with a given isolation chamber 117. This may include motorized control of the shaft 118 and/or separation members 114, motor, stepper motor, servo, solenoid driven ratchet, or other motorized device. In a preferred embodiment, the means to lock the turnstile 110 includes a locking solenoid 156 or electromagnetic brake.

The solenoid 156 which engages the index/lock wheel 160. To lock the turnstile 110 the solenoid 156 moves its pin 157 downwards so that the wheel 160 can rotate until its flange hits the pin. The lock/index wheel 160 is indexed to the turnstile 110 in such a way that when the lock/index wheel 160 hits the solenoid pin 157, the turnstile 110 is in register, and the index wheel 160 first breaks the infrared (IR) beam of the IR position sensor 162. Raising the solenoid pin 157 unlocks the turnstile 110 by allowing the lock wheel 160 to move further (when the animal pushes the turnstile). Alternative embodiments may include an electromagnetic braking mechanism (i.e. a torque control mechanism), a solenoid engaging a ratchet mechanism to prevent further rotation, or a motor driven shaft that moves when sensors on the door detect the animal pushing the turnstile (and stops moving when it does not, thereby preventing the animal from being trapped in the device). Any such motorized arrangement would require either a stepper motor, and/or a worm-gear in the drive train (to resist animals trying to overcome the force of the motor when it is holding the turnstile locked and/or to prevent rotation in the wrong direction).

An assembly 108 may further provide means for identifying the rotational position of the turnstile 110. For example, means for identifying the rotational position of the turnstile 110 may include an index wheel 160 and an infrared position sensor 162. As shown in FIGS. 6 and 7, for example, means for identifying the rotational position of the turnstile 110 may include the use of an index wheel 160 and an infrared (IR) position sensor 162, which may be accurate to $\frac{1}{8}^{th}$ of a turn as needed for the minimal operating characteristics described herein (i.e. the sensor detects when the turnstile is in register by breaking of the beam; and detects when the turnstile 110 is rotated by 45 degrees by the flange blocking the beam rotating out of line with the beam, at which point the solenoid 156 is re-engaged so that the turnstile 110 is held in register once the animal 106 (or mouse) has rotated it a further 45 degrees). In a preferred embodiment, the index wheel 160 and IR position sensor 162 may be incorporated into the roof 136 of the assembly 108 as shown in FIG. 7. Alternative means may include a rotational encoder in addition to or in place of the flanged index wheel arrangement. A rotational encoder would give the absolute angle of rotation of the door, and would require mechanical, electronic, or software indexing to ensure that its zero-point corresponds to the door being in register with a given station. Rotational encoders could be mechanical, resistive, or optical; giving analog or digital positional information. Alternatively a 360 degree rotational servo could both encode turnstile position and move the turnstile in response to sensors detecting if the animal is pushing on the door.

An assembly 108 may further include means to ensure unidirectional rotation of the turnstile. Means to ensure unidirectional rotation comprises motorized control of the shaft of the doors, motor, stepper motor, servo, solenoid driven ratchet, or other motorized device. In a preferred embodiment, the means to ensure unidirectional rotation comprises a ratchet or freewheel clutch 164. As shown in FIG. 7, the roof 136 of the assembly 108 may house a one-way (freewheel) clutch 164 ensuring unidirectional rotation of the turnstile 110. In an alternative embodiment, the shaft 118 itself at the level of the ceiling 136 or the index/lock wheel 160 may be saw-toothed and engaged by a spring-loaded ratchet, thereby allowing rotation in one direction only. An alternative locking mechanism could limit the movement of the head of the ratchet, preventing the ratchet from moving over the tooth of the shaft 118 (or wheel), and thereby locking the turnstile 110. Alternatively motorized control of the turnstile 110 could be used to ensure rotation in the correct direction.

Stimuli Presentation

The housing system 100, turnstile assembly 108, or component part thereof, such as the roof 136 may additionally provide means for stimulus presentation, whereby the stimulus includes full spectrum RGB light, UV light, sound stimuli, electric shocks, odors, magnetic fields, tactile stimuli, or puffs of air. Means to present these stimuli Means to present full-spectrum light with control over light color, intensity, and flashing speeds, sound stimuli, electric shocks, puffs of air, or other stimuli into one or more of the chambers may be provided by a variety of devices. In the embodiment depicted in FIG. 7, devices and/components for stimulus presentation include an RGB LED 166 and its associated RGB LED mount 168; and devices and components for auditory stimuli presentation include a loudspeaker 170 and loudspeaker mount 172. The roof 136 in FIG. 7 may further include animal detection means, including the use of a plurality of passive infrared (PIR) sensors 174 for detecting moving heat sources, and associated PIR mounts 176, as depicted in FIG. 7 and as further described below.

Means to present full-spectrum light with control over light color, intensity, and flashing speeds, sound stimuli, electric shocks, puffs of air, or other stimuli into one or more of the chambers may be provided by a variety of devices. Light stimuli may be provided by RGB LEDs (providing pseudo-color by altering the intensity of the red, green, and blue elements), bulbs with filters, or other light-generating devices. UV light may also be mixed with RGB light sources to cover the full range of colors visible to mice and/or other animals.

Sounds stimuli are presented via a small speaker in the preferred embodiment. Ideally the speaker is capable of producing sounds throughout the range of human hearing and ultrasonic frequencies used by rodents and other animals the speaker/ultrasonic transducer could be driven either by pure tone-generating circuitry, or preferably could play complex waveforms at sampling frequencies suitable for ultrasonic playback.

Electric shocks could be administered through the floor or the turnstile, or the module stations. Puffs of air could be administered through the ceiling 136 or from modular stations 112. Puffs of air would typically by controlled by solenoid valves, and can allow compressed air, with or without additional odors (olfactory stimuli) to be introduced through a small nozzle. The embodiment illustrated in FIGS. 6 and 7 provides light stimuli and sounds stimuli via LEDs 166 and a speaker 170 mounted in the ceiling 136. Additional stimuli that could be presented in modular stations include but not limited to: electric shock, olfactory stimuli, gustatory stimuli (via feed or water), auditory or light stimuli (the embodiment shown has LEDs mounted in the ceiling of the food hopper), and tactile stimuli.

Figure 8:
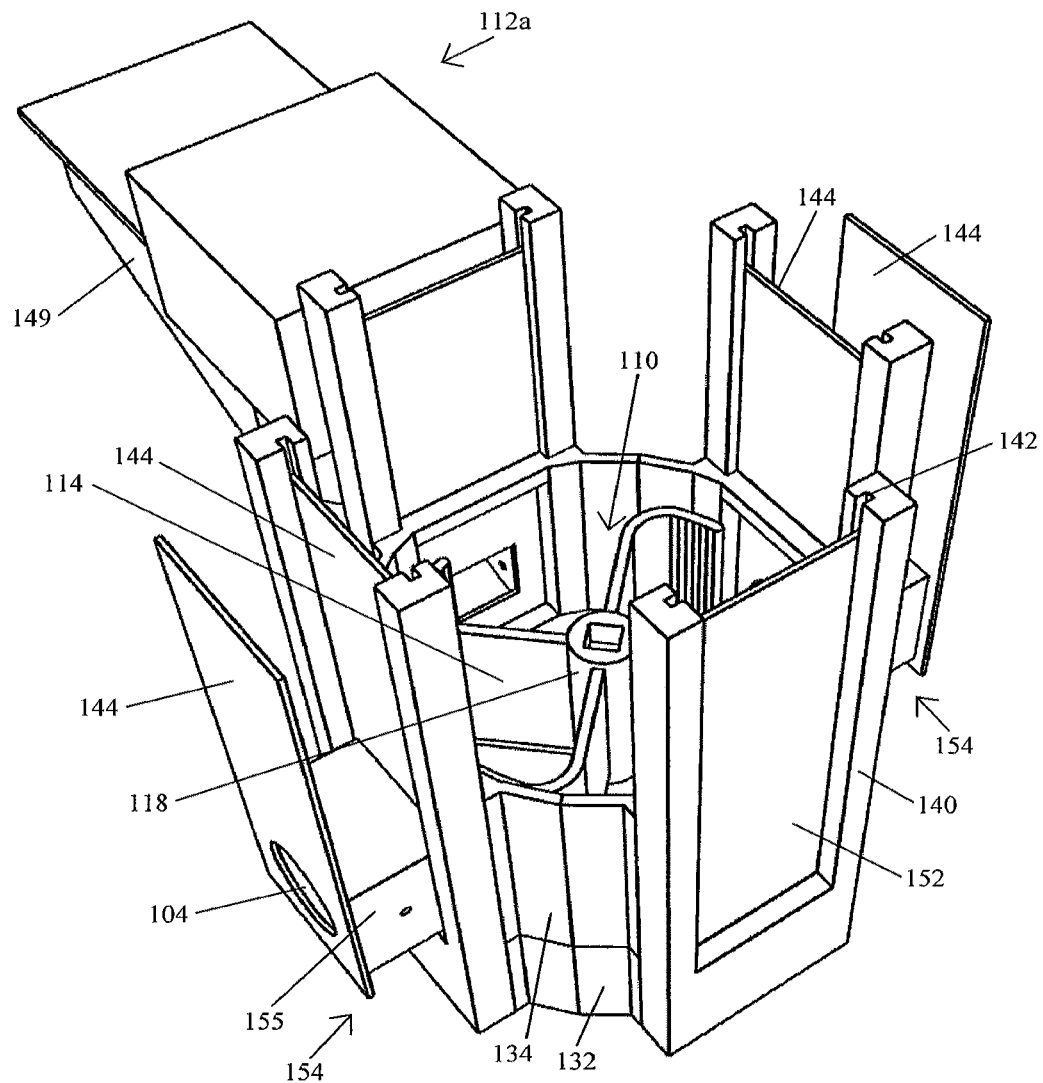
FIG. 8 depicts a turnstile assembly according to another embodiment.

A perspective view of another assembly 108 embodiment is shown in FIG. 8. FIG. 8 shows a turnstile assembly 108 linked to two tunnel passageways 104 or passageway stations 154 on opposite sides. The assembly 108 in FIG. 8 further contains an action station 112 in the form of a feeder station 112 a, and a closing wall 152 (or blank). In FIG. 8, an animal 106 entering the assembly 108 from the left side tunnel passageway 104 would have the option of exiting through a second tunnel passageway 104 on the opposite side prior to entering a feeder station 112 a. An animal entering the assembly 108 from the right tunnel passageway 104 must proceed through the feeder station 112 a before exiting the left tunnel passageway 104 on the opposite side.

Further, rotatable turnstiles may be configured to provide alternative passageways to different stations, measuring devices, alternative cages, holding areas, apparati etc. For example, in FIG. 2, the turnstile chamber 117 includes an entry/exit station connected to a hollow entry tunnel 104 via an aperture in a slotted region of the housing.

FIG. 8 shows an alternative turnstile assembly 108 containing an entry/exit station 154 connected to a hollow entry tunnel 155 via an aperture 138 in a slotted, open region of the housing 130 on one side of the turnstile assembly 108, and a second entry/exit station on the opposite side of the turnstile assembly 108 connected to a hollow entry tunnel via an aperture 138 in a slotted, open region of the housing 130. In addition, FIG. 8 further shows how guillotine doors or action face plates containing an aperture 144 can be used to direct animals 106 out of one of two alternative exits to, for example, different measurement devices, alternative cages, holding areas, or apparati.

Figure 10:
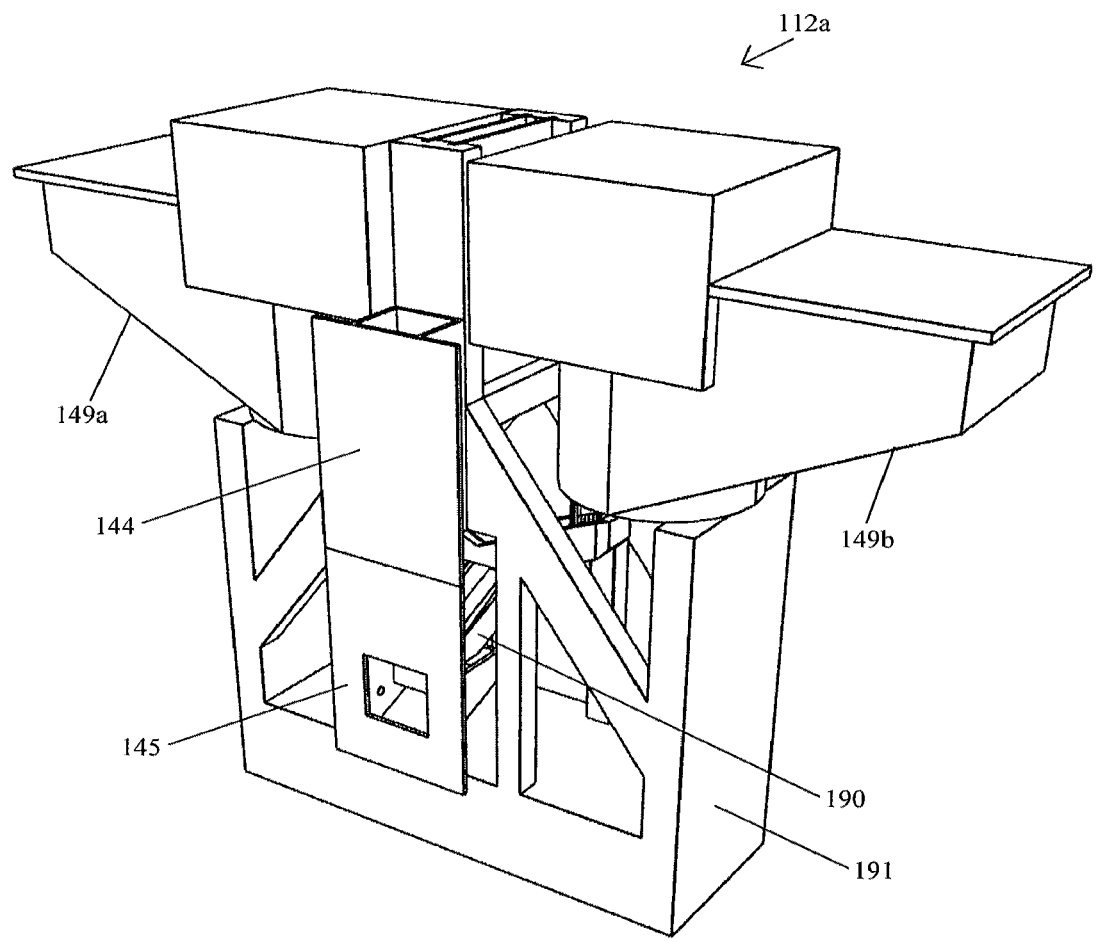
FIG. 10 depicts a dual feeder station for dispensing mixed compositions derived from two feeders.

FIG. 10 shows a dual feeder arrangement allowing two different feeders 149a, 149b to dispense a mixed solid composition to the same hopper 145. The dual feeder includes a dual feeder frame 191 connected to the feeders 149a, 149b. The resulting feeder dual feeder station 112a can be slotted into the guides 140. Using the faceplate 144 attached to the dual feeder 112a. The dual feeder station 112a allows for the feeding of different diets, or medicated versus regular feed, and can allow timed administration of medication, or the feeding of different diets or medications to different animals in the home cage.

Figure 9:
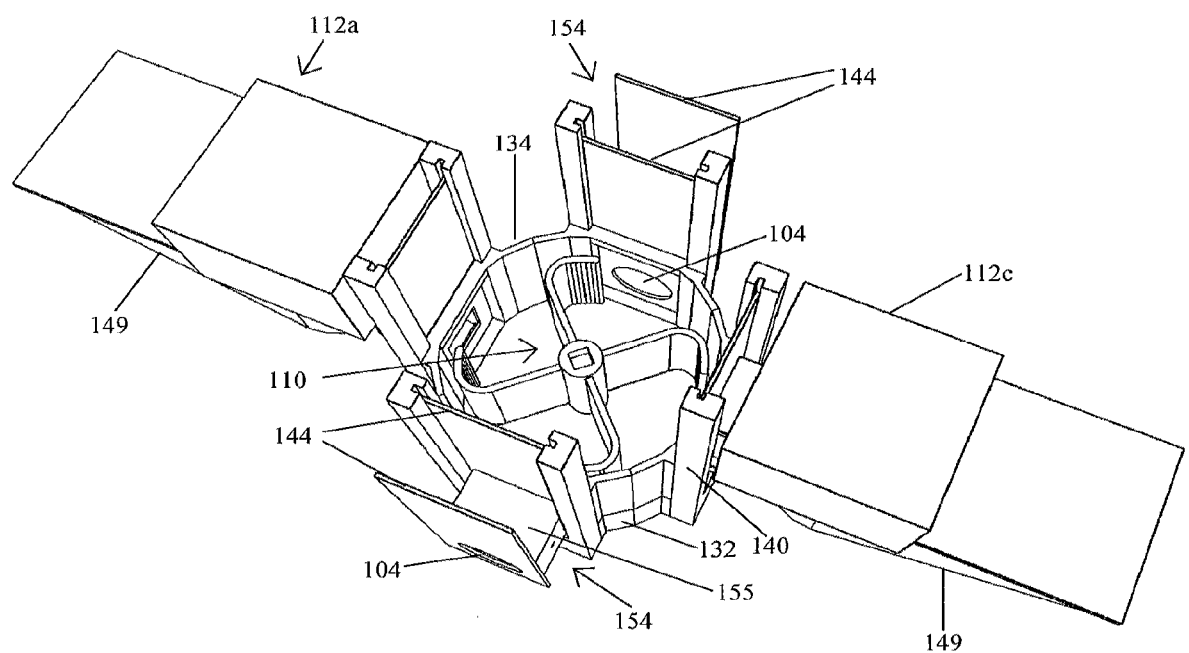
FIG. 9 depicts a turnstile assembly according to another embodiment.

In one embodiment, a full turnstile assembly 108 containing two passageway stations 154 as exemplified in FIGS. 8 and 9, may be incorporated in a T-maze, Y maze, or Y maze plus radial maze, whereby the system 100 includes, for example, two entries and/or exits, one feeder, and a blank position. A typical T-maze arrangement is shown in FIG. 1. As the turnstile turns counter-clockwise, entry via the right-hand entry/exit would expose the animal 106 to a feeder station 112a; while entry via the left-hand exit would pass the animal by a closing wall (or blank) 152. A radial maze would allow an animal 106 to enter or exit via any arm. In FIG. 1, the rotating turnstile 110 creates a reward chamber on the two "exits", while on the "entrance," the mouse passes through the turnstile 110 without receiving reward, and instead can be held in a "stimulus" or "choice" chamber 121, if required.

Stations

The walls 134 in a turnstile assembly 108 may include slotted, open regions or apertures 138 in register with the isolation chambers 117, the apertures 138 being configured for engagement to one or more functionalities in communication with the each of the plurality of isolation chambers 117 for the purpose of forming stations 112 as further described herein. Any one of the isolation chambers 117 in a rotatable turnstile assembly 108 module (or housing system containing the assembly) may be connectively linked to one or more functionalities or structural components so as to form a chamber-specific station. Any one of a variety of different stations may be linked to a rotatable turnstile assembly module. By adding different modular stations, different functionalities can be implemented.

A housing system will generally include a means for animal identification, including animal identification stations, as well as feeder-, drinker-, and/or other attractant device stations providing a "lure" for the animal to be unwittingly measured, tested, or be induced to ingest a drug, for example.

A housing system 100 or rotatable turnstile assembly 108 typically includes an animal identification means. In one embodiment, the home cage 102 includes a segregation compartment 124 in the home cage 102, the segregation compartment 124 is configured to limit access to a rotatable turnstile assembly 108 to only those animals isolated (or temporarily isolated) in the segregation compartment 124. The segregation compartment 124 is separated from a home cage compartment 120 containing the other animals 106 by a segregation barrier 126. In a preferred embodiment, the rotatable turnstile assembly 108 includes one or more action stations 112 providing automated animal identification means. The automated animal identification means may include the use of a radio frequency identification (RFID) tag reader or a passive integrated transponder (PIT) tag reader.

Detection/Identification Stations

A turnstile station or tunnel station may be configured as a detection system, identification station, or combination thereof. Animal detection means may utilize passive infrared (PIR) sensors, IR beams, capacitive or resistive touch sensors, force sensing resistors, and load cells, or other detection/identification methodologies known to those of skill in the art.

Identification Systems

In preferred embodiments, the housing systems 100 and turnstile assemblies 108 utilize animal identification means employing a Radio Frequency Identification (RFID) (also known as Electronic Identification (EID)) tag reader 147 to specifically identify each animal as it enters an identification station, whereby each animal contains a unique RFID or Passive Integrated Transponder (PIT) tag. RFID and PIT tags are small implanted microchips that transmit RFID codes. PIT tags are a form of RFID tag that are unpowered, (hence passive), and receive their power from induction when they pass by the antenna of the scanning device. PIT tags are widely used for animal identification.

RFID technologies use a signal transmitted between an electronic device, such as a "tag", "transponder" or "microchip" and a reading device, such as a "scanner", "reader" or "transceiver". RFID technologies identify objects remotely through the use of radio frequencies. The RFID and PIT devices most widely used in animals are passive. PITs have no battery so the microchip remains inactive until read with a scanner. The scanner sends a low frequency signal to the microchip within the tag providing the power needed to send its unique code back to the scanner and positively identify the animal. PITs are designed to last the life of the animal providing a reliable, long term identification method.

The distance from which a tag can be read is called read range. Multiple factors may contribute to the read range of passive tags, including operation frequency, antenna power, tag orientation, and interference from other devices. Low frequency tags are detected in milliseconds at close range from a few inches to about a foot (0.33 meter) in distance. Tags can be read through materials such as soil, wood and water. Ferrous metals and noisy environments can cause interference between the electromagnetic communication of the reader and tag.

PIT tags are typically injected subcutaneously using a 12-gauge hypodermic needle and syringe; they can also be externally attached using adhesives. Implant location varies depending on the species being studied, animal size and in some cases the behavior of the animal. Tags that are pre-loaded into an implanter, gas sterilized and individually packaged are available and convenient for tagging in the field.

The use of passive tags for animal identification and research provides many benefits including the reduction of error in recording data, rapid data collection and long term reliability. The value of PIT tags has been successfully demonstrated in studies of mark and recapture, survival, movement, behavior and distribution for a variety of species.

Some PIT tags can now report body temperature, heart rate, and metabolite (e.g. glucose) information. Such alternative tags may be integrated into the systems described herein. The advantage of PIT tags over active RFID devices is that they are unpowered, as a result they are far smaller, far lighter, far less invasive, and they never run out of power. The advantage of active RFID devices is that they can also incorporate radio telemetry to report a much wider range of physiological variables (e.g. www.datasci.com). However, both active and passive RFID devices for rodents currently do not store information "on board" and must relay information in real time to a computer via antennas mounted under or around the cage. Both active and passive RFID tags could be used in the system.

A housing system 110 or turnstile assembly 108 may include stations or compartments providing automated means for providing a solid composition, automated means for providing a liquid composition, automated means for providing a reward, automated means for providing a punishment, automated means for recording one or more animal measurements, automated stimulus presentation means, automated animal imaging means, automated compound tactile stimulus presentation means, and combination thereof. Any one of these additional means may be provided by an action station 112, home cage 102, or system passageway 104. The additional means may be provided by a single or multiple action stations 112 in the rotatable turnstile 110.

Feeder Stations

In another embodiment, a turnstile station 112 and/or tunnel station 128 may be configured as a feeder station dispensing one or more food compositions, including food compositions spiked with one or more drug compositions, or combinations thereof. The use of suitably configured feeder (and drinker) stations allow for various automatic treatment applications, including but not limited to providing different diets to different animals, feeding different diets at different times of day, rationing feed or water intake, depriving animals at particular times of day, dispensing medicated feed or water. Feeder stations 112a (as well as drinker stations) may or may not be computer controlled. However, for accurate recording of feeding behavior, including dispensing of pre-determined compositions and amounts, feeder stations (and drinker station) are typically computer controlled.

FIGS. 2, 5, 8, 9, 12, and 13 depict assemblies containing feeder stations 112a connectively linked to an isolation chamber 117. The feeder station 112a includes a feed hopper 145, which is linked to one or more feeders 149. A feeder 149 may be connected to the feeder hopper 145 using the same grooved guides 140 as previously discussed above. A housing system 100 may be configured so that the feed hopper 145 is configured to dispense a pre-determined amount of a uniform feed composition from a single feeder 149 under computer control, depending on the identification of animal 106 in an identification station 112b temporally linked to the feeder station 112a. Further, the feed hopper 145 may be configured to dispense different amounts of the uniform feed composition under computer control, again depending on the identification of animal in an identification station 112b temporally linked to the feeder station 112a. In other words, the housing system 100 may be configured so that predetermined pools of animals receive different amounts of the same feed composition.

In an alternative embodiment, a feed hopper 145 may be configured to dispense a pre-determined amount of a mixed feed composition from at least two different feeders as shown in FIG. 10. The mixed feed composition may include different food compositions from each feeder 149, or a mixed feed composition containing a food composition from one feeder 149a and a drug composition from another feeder 149b. Alternatively, one feeder 149a may contain a mixed feed composition containing a food composition and a first drug composition, and the other, 149b a second feed composition, including the same or different food composition along with a second drug composition.

In addition, the system may be configured so that the feed hopper 145 dispenses pre-determined amount(s) of a mixed feed composition under computer control, depending on the identification of animal 106 in an identification station 112b temporally linked to the feeder station 149. Accordingly, the system 100 may be configured so that the feed hopper 145 dispenses different amounts of a mixed feed composition or different amounts of at least two different mixed feed compositions under computer control depending on the identification of animal in an identification station 112b temporally linked to the feeder station 149. In other words, the housing system may be configured so that predetermined pools of animals receive different amounts of one or more mixed feed compositions.

In one embodiment, an turnstile isolation chamber 117 is configured to form a drinker station 112d (not shown) containing at least one drinker 151 dispensing one or more liquid compositions, including liquid compositions spiked with one or more drug and/or food compositions, or combinations thereof. The system 100 may be configured so that the drinker station 112d is configured to dispense a pre-determined amount of a liquid composition (such as water), including different amounts of one or more liquid compositions from a drinker 151 under computer control, depending on the identification of animal in an identification station 112b temporally linked to the drinker station 112d. Thus, the housing system 100 may be configured so that predetermined pools of animals receive different amounts of the same or different liquid compositions.

Measurement Stations

A turnstile station or tunnel station is linked to one or more measuring devices to constitute a measurement station 112e. Alternatively, the measuring devices may be localized in other system locations other than turnstile isolation chambers 117, including system passageways 104 and/or the home cage 102. The measuring devices may be designed to provide measurement of basic biometric and/or physiological data. Measurement devices may be mounted in any portion of the housing system, preferably an isolation chamber 117, including the base 132, floor 133, or roof 136, using any suitable measurement technologies known in the art, including those providing measures of galvanic skin response or ECG taken through the feet as described in www.mousespecifics.com, or alternative telemetry systems as described in www.datasci.com, for example.

Figure 11:
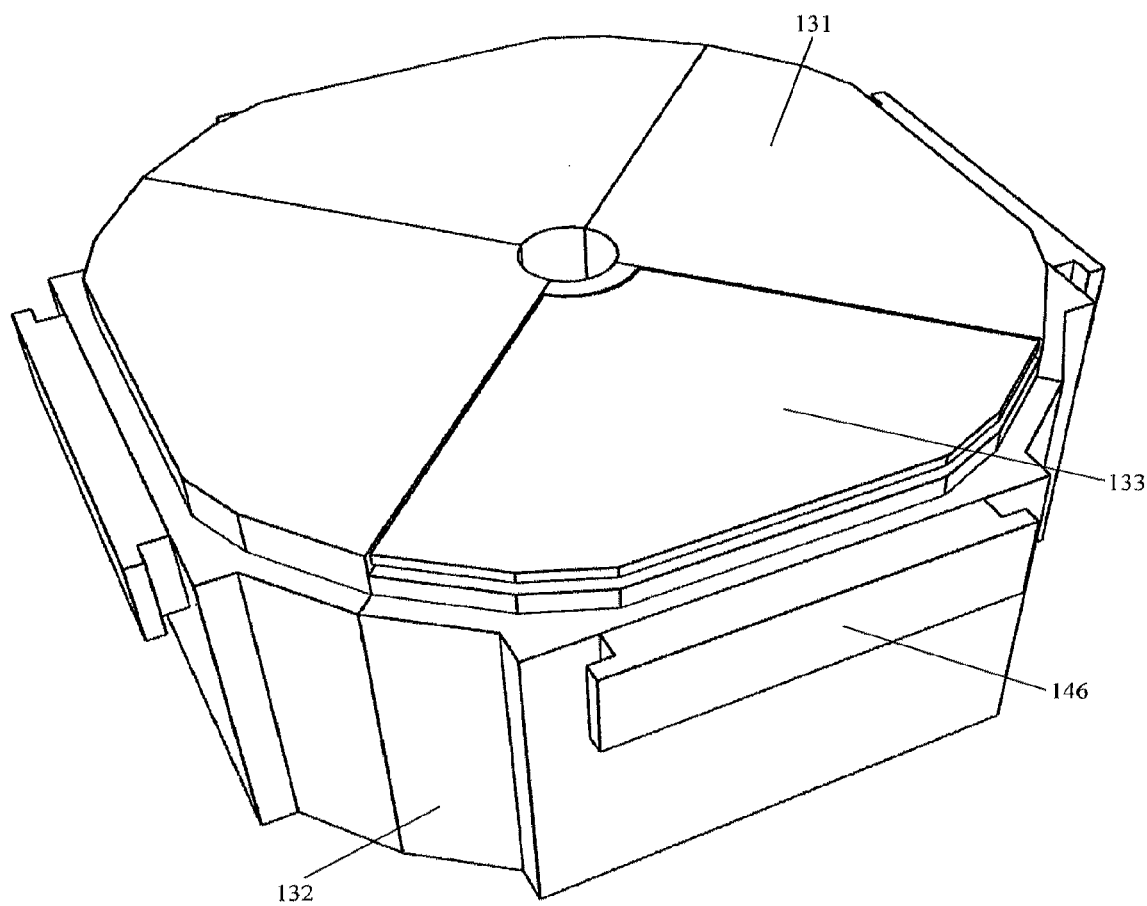
FIG. 11 depicts a portion of a turnstile assembly, including a base and a floating floor weigh station.
Figure 12:
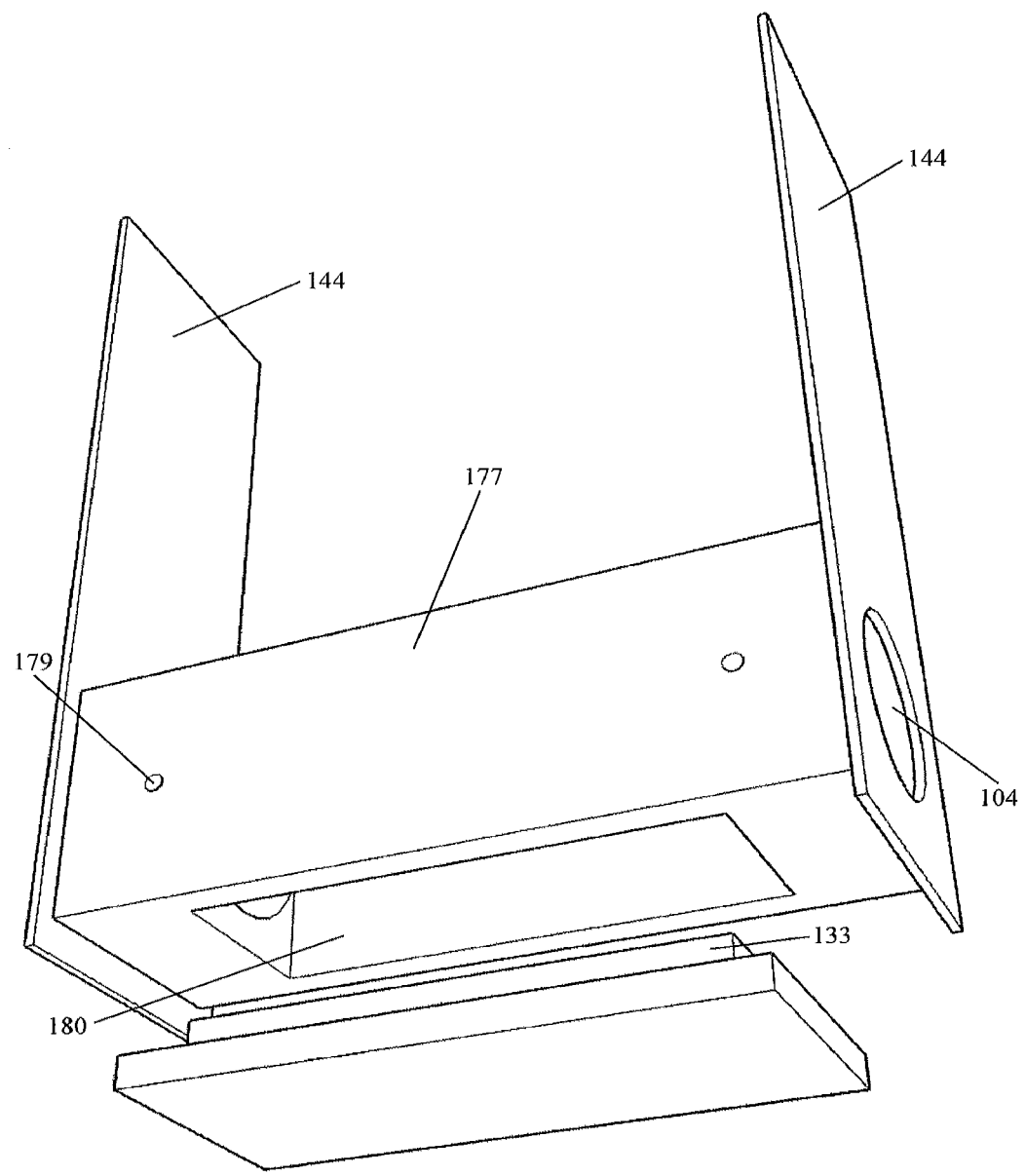
FIG. 12 depicts an alternative floating floor weight station embodiment.

In a specific embodiment, the floor of the base may include the measuring device, such as a floating floor 133 for measuring weight, measuring ECG, or collecting urine or feces samples (see FIGS. 10, 11). Alternatively, a transparent floor can facilitate acquisition of video or still images, or preferably coupled with a similar camera in the ceiling to gain a 360 degree view of the animal in the chamber. Such images can be used to determine postures associated with illness; foot size (for instance to quantify arthritic swelling), measures of surface skin or fur lesions, thermographic measurement of radiated body temperature (which can reflect swelling, estrous, wound healing, and other physiological variables). Alternatively, animals incorporating luminescent or radioactive compounds may provide a further means for imaging.

A measurement station 112e may include one or more sensors, including an identification sensor for identifying each animal (e.g. a RFID reader, 147), and sensors for measuring a variety of desired variables, including weight, body temperature, electrocardiography (ECG), electroencephalography (EEG), body cavity or vessel pressures, heart rate, activity, feeding behavior, and the like. An identification sensor 147 can allow for identification and tracking of each mouse while it is being measured. A load cell may be incorporated, for example, to allow automatic weighing of mice. An infrared (IR) beam may be employed to detect the presence of mice not fitted with RFID tags.

Measurement devices/procedures that may be included in a measurement station 112e include, but are not limited to: (1) PIT tags relaying temperature, heart rate or other physiological variables; (2) telemetry devices relaying temperature, heart rate, ECG, EEG, body pressures or other physiological variables; (3) photographs; (4) video, such as video of gait patterns etc.; (5) X-ray, infra-red or other imaging; (6) non-invasive assays, including ECG; (7) fecal or urinary sampling; (8) body weight; (9) feeding behavior taken from the feeder module; (10) recording of ultrasonic vocalizations, either spontaneously, or in male mice in response to the presentation of female urine odors; (11) Simple learning paradigms (e.g. choosing between the two feeders on the basis of a stimulus presented at the central drinker location) employing visual and/or olfactory cures; (12) complex learning paradigms (e.g., choosing between the two feeders on the basis of a compound tactile stimulus presented at the central drinker location).

The measurements may be completely automated, reducing or eliminating the need for experimenter handling or human interaction. Measurement stations may employ implanted sensors or sensors mounted in the tunnel wall using conventional sensor/measurement components and methodologies. In particular, the sensors and other items may be slotted in-and-out of the rotatable turnstile assembly, and in-and-out of the software supporting the system, to tailor the system to the particular needs of each individual researcher.

FIG. 11 shows a portion of an exemplary assembly in which the base 132 is modified to allow weighing of animals 106 via a floating floor 133. Here the floating floor system 133 lines up with the turnstile 110 when it is locked, so that the floor is essentially part of the action station 112. The floating floor 133 in this base 132 can incorporate multiple measurement devices, as described above, including devices for collecting fecal or urinary samples, including devices rotating blotting paper on the floor, or using mirrors and cameras/videos to provide 360° views of the animal. A wheel of wells may be rotated under one or more measurement stations so that urine and feces from each mouse is collected in their own unique well, on the basis of its own corresponding RFID code.

The floating floor 133 in FIG. 11 may be adapted in combination with an RFID tag reader 147 in accordance with the turnstile assemblies depicted in FIGS. 2, 5, and 6, whereby animals are automatically identified and weighed in the same isolation chamber 117. Accordingly, such a system can be used to perform a variety of group-housed studies of feeding behavior employing different diets using different feeding stations, including dietary choice studies (e.g. if one feeder contained a high-protein source; and one a high-carbohydrate source), illness detection, and other methodologies further described below.

Compound Tactile Stimulus Presentation

In another embodiment, a compound tactile stimulus presentation device or system may be incorporated in conjunction with means for delivering rewards, punishments, or neither, depending on a pre-determined compound tactile stimulus presented to the animal and the animal's response thereto.

A system 100 for presenting compound tactile stimuli to a test subject includes a compound tactile stimulus device 125 comprised of a plurality of overlapping stimulus presentation members, each stimulus presentation member including one or more stimulus exemplars related by a specified dimensional property. The device 125 includes means for moving the stimulus presentation members relative to one another, aligning the exemplars from one presentation member with exemplars in other presentation member(s) to form a pre-determined compound tactile stimulus comprised of at least two tactile stimulus exemplars. One or more of the tactile stimulus exemplar include one or more open spaces allowing the test subject to investigate (and discriminate between) the stimulus exemplars underlying the compound tactile stimulus by extending one or sensory members through the one or more open spaces.

Presentation of compound tactile stimuli may be limited to tactile exemplars or they may additionally include olfactory, auditory, or visual exemplars, or combinations thereof. The compound tactile stimulus include front, center, and back tactile stimulus exemplars presented from front, center, and back stimulus presentation members in which each of the front and center tactile exemplars have one or more open spaces. Alternatively, the stimulus presentation members may be mounted behind a panel containing a window focusing an animal's attention and restricting its physical access to the compound tactile stimulus through the window via open spaces in the stimulus exemplars.

The compound tactile stimulus presentation system may employ manual or automatic means for moving and aligning the stimulus presentation members to present a pre-selected compound tactile stimulus. An automated compound tactile stimulus device may include positional means for determining the position of the stimulus presentation members; driving means for driving the stimulus presentation members; controlling means for controlling the position and movement of the stimulus presentation members; signaling means for coordinating execution of the positional, driving, and controlling means, and investigation means for determining whether the compound tactile stimulus has been investigated by an animal. By way of example, an automated compound tactile stimulus device may include a positional switch for monitoring the positions of the stimulus presentation members, a controlling device operatively coupled to one or more motors for driving the stimulus presentation members, interface electronics operatively coupled to the controlling device for coordinating signals between the controlling device, one or more motors to control movement of the stimulus presentation members; and an infra-red (IR) beam for determining that a compound tactile stimulus has been investigated by an animal.

The stimulus presentation members may be rotatable or laterally extendable relative to one another. Additionally, the stimulus presentation members may be configured as overlapping members in a triangular or co-axial arrangement. The stimulus presentation members may be configured as a plurality of stimulus wheels, each wheel including one or more stimulus exemplars related by a specified dimensional property. By way of example, the compound tactile stimulus device may include a front stimulus wheel, a center stimulus wheel, and a rear stimulus wheel. Exemplars in the front stimulus wheel may include cut outs varying by shape; exemplars in the center stimulus wheel may include various patterns of lines against a background comprising one or more open spaces, exemplars in the rear stimulus wheel comprise exemplars comprising variously textured substrates.

Devices and methods for compound tactile stimulus presentation, including animal behavioral tests associated with compound tactile stimulus presentation are described in U.S. Provisional Patent Application No. 61/146,512, filed Jan. 22, 2009, and PCT Appl. No. PCT/US10/21805, filed Jan. 22, 2010, the disclosures of which are expressly incorporated by reference herein.

In one aspect, the housing systems 100 described herein are used in conjunction with a compound tactile stimulus presentation device for behavioral studies. In one embodiment, an animal behavioral test includes exposing an animal to a compound tactile stimulus presentation system according to the present invention so that at least one pre-determined compound tactile stimulus is presented to the animal, whereby the stimulus indicates one or more locations that may or may not contain an accessible reward, punishment, or neither. Conditions suitable for enabling the animal to receive the reward, punishment, or neither, depending on the animal's response to the compound stimulus are provided. These steps are repeated, altering the compound tactile stimulus as appropriate until a suitable number of tests have been obtained in accordance with the underlying behavioral test or behavioral paradigm(s) which are being investigated.

The means for delivering rewards or punishments include, for example, the feeders and drinkers described above, and may additionally include the use of controlling devices programmed to deliver these and other rewards or punishments via computers, remote control devices, or mechanical or electromechanical or electrical means directly operated by the experimenter. By way of example, the housing may include one or more feeders programmed under control of a controlling device, such as a computer, to deliver a pre-determined amount of a reward, such as food, water, drugs or other rewards under computer control as described above. The housing system may further include a means for determining whether the animal has investigated the compound tactile stimulus, and a means for receiving the rewards or punishments by other devices.

Exemplary rewards include but are not limited to food, water, palatable liquid solution(s), and palatable solid pellet(s); rewarding drug(s), such as cocaine, alcohol, and nicotine; access to sexual partners or conspecifics; access to desired resources, such as nesting material(s), shelter, changes in ambient temperature, changes in ambient light; intercranial electrical or chemical stimulation of the brain; access to secondarily conditioned reinforcers (i.e., stimuli under a Pavlovian association with reward); shelter from aversive stimuli, such as uncomfortable temperatures, bright lights, loud noise, puffs of air, electric shock, or noxious odors; combinations thereof; and the like.

Exemplary punishments include but are limited to uncomfortable temperatures, bright lights, loud noise, puffs of air, electric shock, isolation from conspecifics, unpalatable liquids or solids, noxious odors (such as ammonia), noxious drugs, combinations thereof, and the like.

A housing system may include a plurality of compound tactile stimulus devices, each device independently configured to present a pre-determined compound tactile stimulus to the animal indicating one or more locations that may or may not contain an accessible reward. Alternatively, the pre-determined compound tactile stimulus may indicate one or more locations that may or may not contain an accessible punishment. Further, the system may be configured so that multiple compound tactile stimuli are presented concurrently, sequentially, or in combination thereof. With the inclusion of a compound tactile stimulus presentation device or system, the present invention provides a housing system providing an automated test environment in which pre-determined compound tactile stimuli, rewards, and punishments are presented under control of one or more controlling devices, and behavioral data is automatically generated and entered into one or more controlling devices.

Alternative Housing Systems

A system for conducting high throughput animal experiments may be extended to other configurations with or without the use of a rotatable turnstile. A high throughput cage system according to the present invention is preferably designed to restrict access to only one animal at a time in any given station. This ensures that actions executed in a given station can be tracked to a specifically identified animal. Thus, in preferred embodiments the system is configured using suitably designed routing schemes employing suitably placed turnstile assemblies 108, tunnel stations 128, and/or one one-way passageways 104 to ensure that an animal exits the home cage in a predetermined tunnel passageway sequence in which specific identification of an animal in an animal identification station can be linked to additional tasks or actions executed by that animal prior to or following identification.

In one embodiment, a system 100 for conducting high throughput animal experiments includes a home cage 102 and at least one tunnel station 128 comprising at least one isolation chamber 117, the tunnel station 128 directly linked to either one of a home cage 102 or a tunnel passageway 104 directly or indirectly connected to the home cage 102. The tunnel station 128 includes an automated animal identification means and at least one additional means selected from the group consisting of automated animal detection means, automated means for providing a solid composition, automated means for providing a liquid composition, automated means for providing a reward, automated means for providing a punishment, automated means for recording one or more animal measurements, automated means for animal imaging, automated stimulus presentation means, automated means for compound tactile stimulus presentation, and combination thereof. Preferably, the tunnel station is configured to allow entry of a single small experimental animal, such as a rodent or mouse therein, but to exclude entry by additional animals of the same type, as well as larger animals altogether, including human adult subjects.

Action stations 112 may be located in short tunnel passageways to form the tunnel stations 128. Entry into the tunnel station 128 may or may not require entry through a closing device 181, such as a bar, gate, or door. In one embodiment, entry into the tunnel station 128 is accompanied by a lockable bidirectional gate 181 temporarily retaining the animal in the action station until one or more animal-directed or experimenter-initiated actions have been completed, whereupon the animal may return to the passageway 104 or home cage 102 from which it came.

Figure 15:
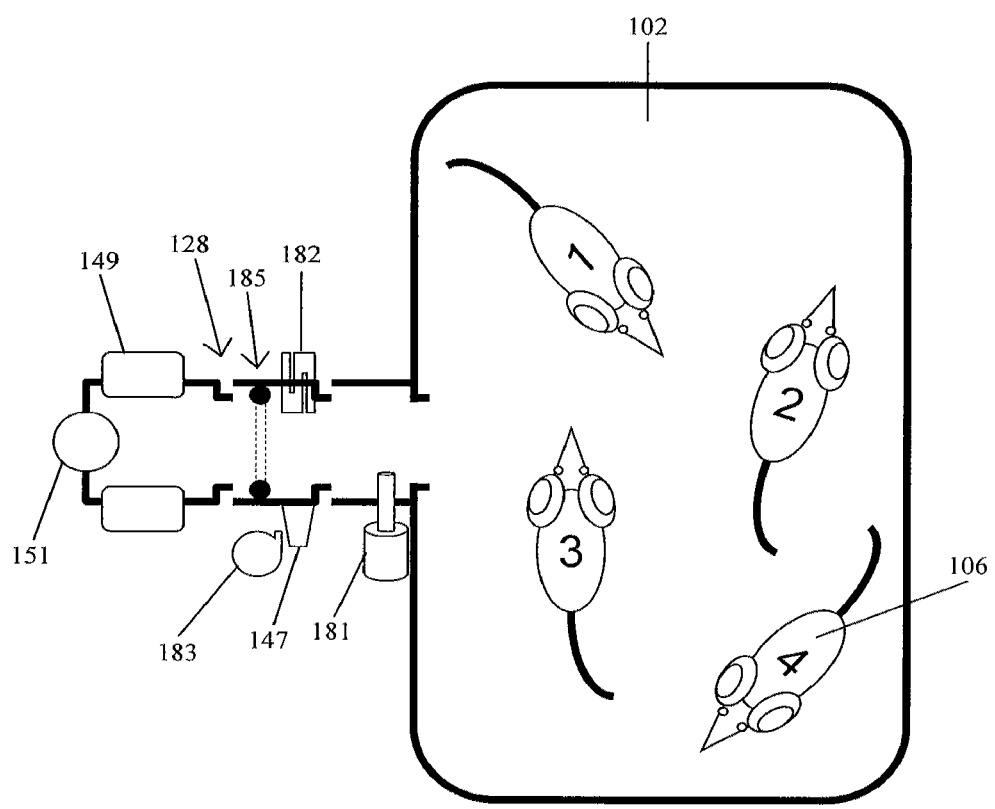
FIG. 15 depicts an alternative housing system containing a tunnel station functionally coupled to a home cage.

FIG. 15 depicts a simple housing system 100 containing a tunnel station 28 in which entry of a small animal or mouse is achieved through a lockable bidirectional bar or gate 181. In FIG. 15, the tunnel station 128 has a length and/or diameter restricted to the size of a small experimental animal 106, such as a mouse, in order to restrict access to the isolation chamber 117 one animal at a time. A tunnel station 128 may be located between two closing devices 181, between two rotatable turnstiles 110, or combination thereof.

Entry into the short tunnel passageway 184 may or may not require entry through a door, bar, gate, or other suitable closing device 181. Where a closing device 181 is opened to access the tunnel station chamber 117, the closing device 181 may be lockable (under computer control) or unlockable. In addition, the closing device 181 may facilitate unidirectional or bidirectional passage therethrough.

In one embodiment, entry into the short tunnel passageway 184 is accompanied by a lockable bidirectional closing device 181 temporarily retaining the animal 106 in the action station until a predetermined period of time has passed or until one or more actions have been completed (or both). Following completion of the one or more actions, the animal 106 may return to the passageway 104 or home cage 102 from which it came.

In another embodiment, an animal 106 may enter a tunnel station 128 through a proximal unidirectional closing device 181, whereupon completion of one or more tasks, the animal 106 exits through a distal unidirectional closing device 181. Either one or both of the proximal and distal unidirectional closing devices 181 may be a lockable closing device. In a particular embodiment, the tunnel station 128 includes a first lockable unidirectional closing device on the proximal end of the tunnel station chamber 117 and a second lockable unidirectional closing device 181 on the distal end of the tunnel station chamber 117. Following entry into a tunnel station 128, the proximal and distal closing devices 181 may be locked under computer control, preventing movement to additional stations 112 or passageways 104 until a predetermined period of time has passed, or until one or more actions have been completed, or both, as further discussed below.

A second lockable or unlockable closing device 181 may lead to another tunnel passageway 184, another tunnel station chamber 117, or a rotatable turnstile 110. Thus, a tunnel station 128 may be located between two closing devices 181, between two rotatable turnstiles 110, or combination thereof. Where tunnel stations 128 are piggy-backed on other tunnel station chambers 117, the tunnel stations 128 may be arranged in a head-to-tail fashion, in which case the terminal station 128 may lead into another tunnel passageway 104, 184.

In another embodiment, the tunnel station 128 is in open communication with one or more passageways 104, 184 leading thereto. In this embodiment, entry into the open tunnel station 128 does not require passage through a closing device 181. Instead, the tunnel station is sufficiently sized to enclose or accommodate a single small animal 106 so as to exclude entry by additional animals of the same type, as well as exclude larger animals altogether, including human adult subjects etc. As in the other embodiments, the tunnel station 128 includes means for identifying the animal 106 and additional means for providing food, providing drink, providing one or more drugs, providing a reward, providing a punishment, recording one or more animal measurements, or combinations thereof in accordance with the teachings herein. In a further embodiment, the open tunnel station 128 may contain a closing device at the distal end which may prevent further movement to additional stations 112 or passageways 104, 184 until a predetermined period of time has passed, or until one or more actions have been completed (such as animal detection/identification), or both as further described herein.

FIGS. 16*a*-16*d* depict exemplary tunnel station 128 embodiments, whereby the order and arrangement of sensors and gates may be modified to achieve different functionalities. By way of example, whereby the station 128 in FIG. 16*a* uses one IR beam, the station 128 in FIG. 16*c* uses two IR beams. In contrast, the station 128 in FIG. 16*b* has two locking gates, whereas the stations in FIGS. 16*a* and 16*c* have only one. FIG. 16*d* illustrates a urine and feces collection system 186 for use in the tunnel station 128. This system 186 includes a wheel 187 of wells 188 rotated under the tunnel station 128 so that urine and feces from each mouse can be collected in its own unique well (on newly placed filter paper), on the basis of the RFID code determination in the tunnel station 128.

Figure 17A:
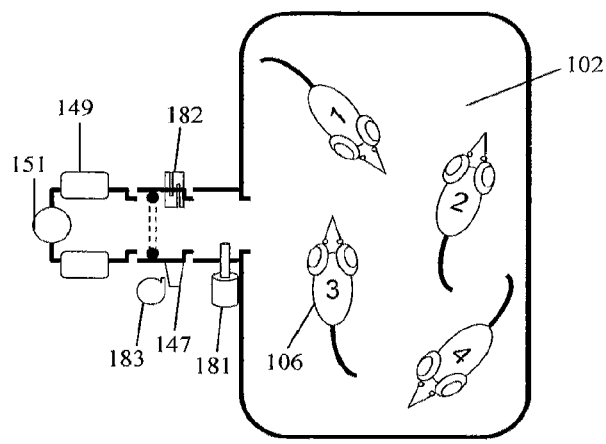
FIG. 17 depicts the sequence of events relating to a mouse entering and leaving the tunnel station.
Figure 17B:
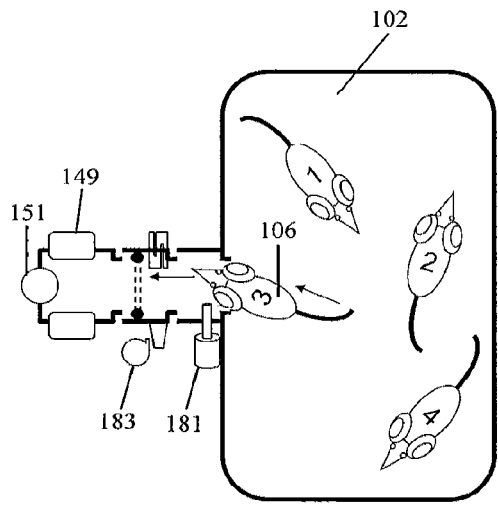
Figure 17C:
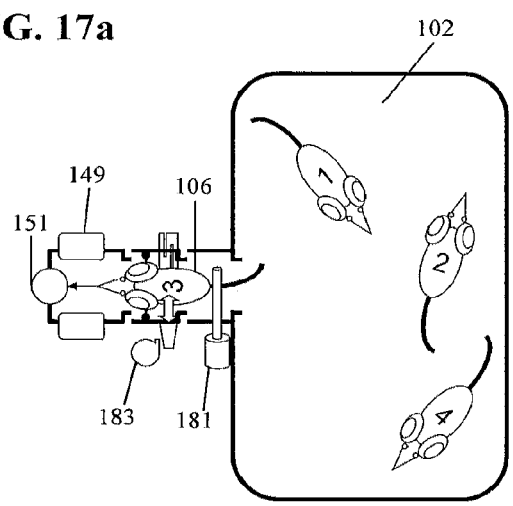
Figure 17D:
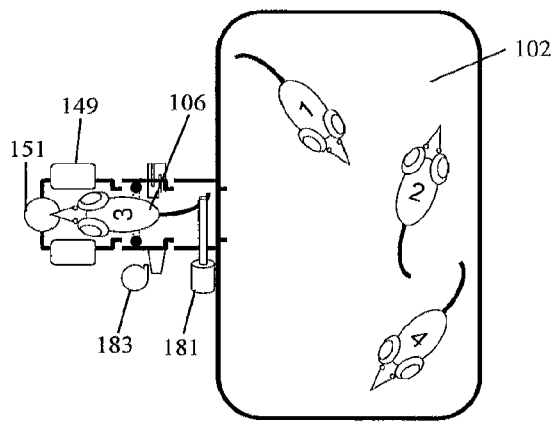
Figure 17E:
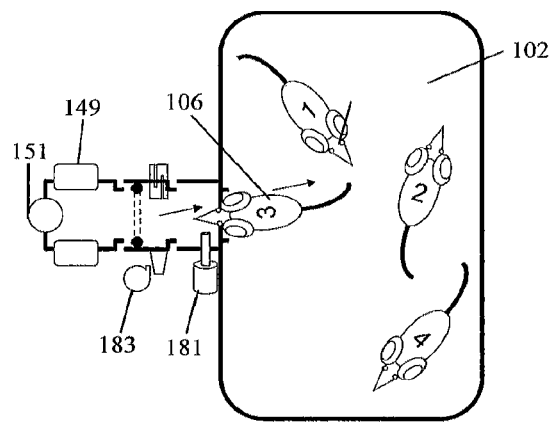

FIGS. 17*a*-17*e* depict an exemplary sequence of events involving entry into and out of the tunnel station 128 depicted in FIG. 15. In FIG. 17*a*, the tunnel station 28 is empty. In FIG. 17*b*, a mouse enters the tunnel station 28 to feed. In FIG. 17*c*, the bidirectional gate 181 is locked, trapping the mouse 106 in the tunnel station 128 for identification using a suitable RFID tag reader 147. In FIG. 17*d*, measurements are taken (as desired) with respect to e.g., feeding behavior, and in FIG. 17*e*, the mouse is released by unlocking the gate 181 and allowing the mouse to exit by its own volition. Alternatively, the animal 106 may be held in the chamber 184 for collection therefrom so as to not disturb the other animals in the home cage 102.

The tunnel station may include positions into which modular drinker or feeder units can be slotted. Drinker or feeder units may be simple passive hoppers and sippers, or may be computer controlled. In the case of computer controlled devices, the minimum requirement is for the device to detect 'head entry' (i.e. an attempt to retrieve food or water) and to dispense food or water appropriately, and to record the appropriate data. In addition, the tunnel station may incorporate other measuring devices, including commercially available devices as described above.

The entire tunnel station may be counterbalanced and supported via a load cell mounted thereon, so that the small animal (or mouse) is weighed upon entering the tunnel. In addition, the use of clear plastic construction can allow for automatic digital photographs of mice to be taken and databased.

A simple bar or portcullis gate may be employed as a suitable closing device using suitable photobeams and physical resistance cut-offs for purposes of safety (and to ensure that animals do not get trapped or pinned under the closing gate). An RFID reader 147 may be included ahead of the gate in the tunnel station, whereby the gate is normally kept closed so that the tunnel station can exclude other animals from the feeder, as shown in FIG. 11*c*.

The use of two consecutive tunnel stations arranged in head-tail fashion, may allow the precise holding of an animal (or mouse) for measures to be taken. One advantage of this set up is that animals are expected to rapidly learn the contingency required to open the second gate and gain access to food (especially with suitable "shaping" or training protocols written into the software). Thus, it should be possible to train animals to enter, and remain still for accurate weighing for instance, before the second gate opens and provides access to food.

Cage/Maze System Configurations

The present invention provides a system for high-throughput animal behavioral studies, including an automated 24 hour a day living environment allowing animals to unwittingly participate in behavioral experiments during normally active time periods in which they are motivated to execute normal tasks and behaviors, such as foraging, whereby they work for their food and other resources, while generating behavioral data during their daily routine.

By joining multiple doors, stations, passageways, and choice areas together, including multiple lockable exits, animals can be provided options for choosing and controlling their movements through an experimental housing system where responses are automatically recorded. Thus, for example, an animal (or mouse) can be presented with a variety of different choices, including: choosing between feed and water, choosing between different types of feed or water, choosing a medicated versus non-medicated feed or water, choosing alcohol (or another drug) or not, choosing two (or more) different routes through a maze, choosing companions or mates, choosing housing conditions (e.g. a warmer or colder cage), etc.

The choices may further affect a mouse's access to particular parts of an apparatus, by limiting, for example, access to food, running wheels, mates, or other resources to particular mice, or to particular times of day; and limiting access to data recording equipment to particular times of day, or to particular mice. Thus, to maximize motivation and cognitive performance in an automated maze, one might pattern or limit access time to ensure that animals always remain a little hungry. Alternatively, one may evaluate certain measures (e.g. measures of gait on a treadmill, or photographs to assess coat condition) requiring special apparati, which may only require one visit per animal per day.

Figure 14:
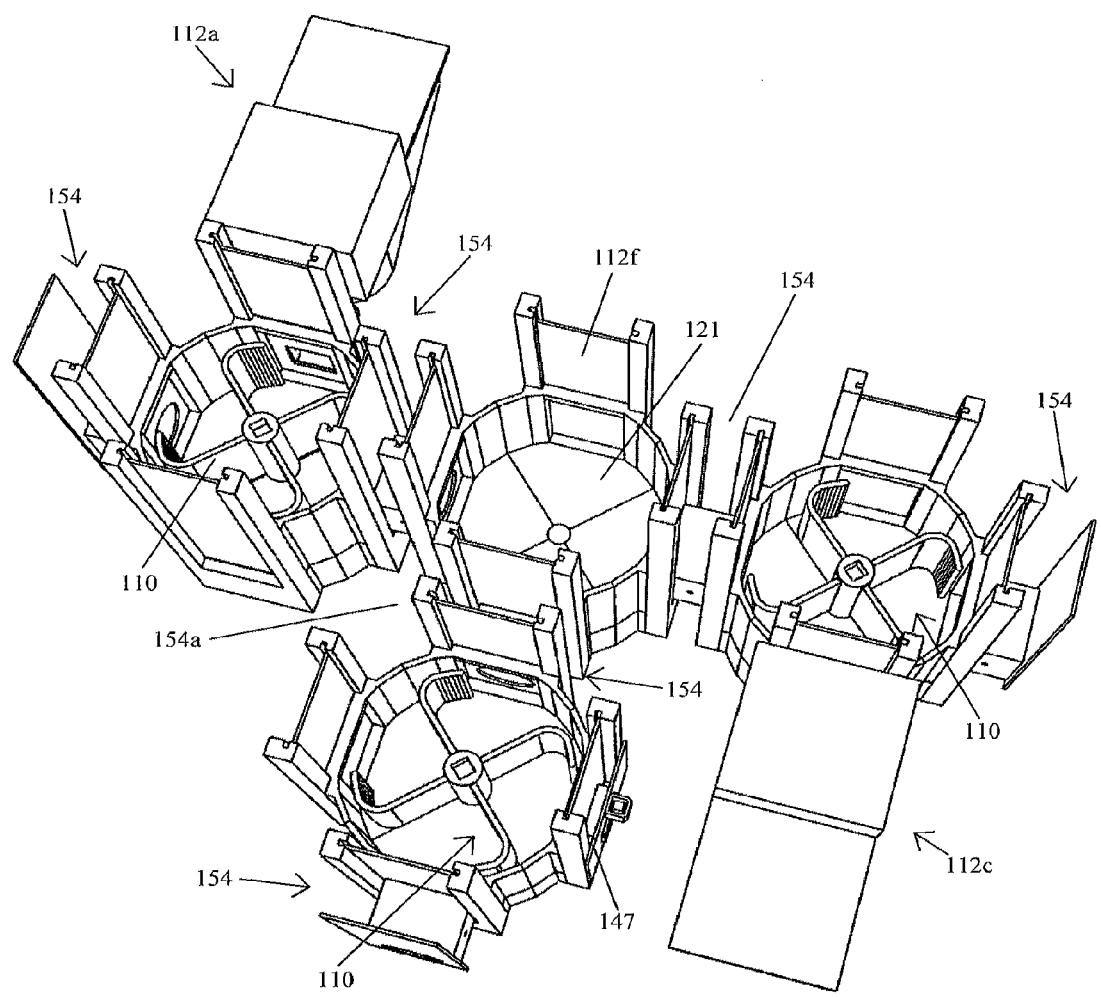
FIG. 14 depicts and alternative turnstile assembly comprising multiple rotatable turnstiles.

At a minimum, the housing system preferably includes a home cage for housing one or more animals. The home cage may be connected to one or more housing compartments or sub-compartments enclosing a plurality of the above described chamber stations, including rotatable turnstiles, tunnel stations, and combinations thereof. The housing compartments may be configured as a maze, operant chamber, skinner box, or combination thereof, any one of which may be divided into one or more sub-compartments. Housing compartments or sub-compartments may further be further separated from one another or include one or more passageways, tunnels, one-way doors, guillotine doors, trapdoors, or other doors or obstacles that can be opened and closed and/or locked to limit the direction of travel or the choices available to the animal. Housing compartments, including mazes, may further include one or more "choice chamber" where passageways or tunnels join together in a hub (for the maze application), linking multiple stations (and tunnels) to be joined together, so as to provide choices for alternative routes of direction. For example, as shown in FIG. 14, a choice chamber 121 may include a rotatable turnstile assembly without the turnstile 110.

Exemplary mazes include "T mazes" and "Y mazes." A T maze (shaped in a T) is where an animal enters through one door and chooses to exit through a left-hand or right-hand passageway, door, or turnstile. A T maze may additionally present a stimulus at a decision point or choice area at the junction between the left and right passageways, doors, or turnstile. An exemplary T maze is illustrated in FIGS. 1 and 14. A Y maze (shaped in a Y) is where an animal can enter and exit through any passageway.

By combining and connecting multiple doors into a variety of different cage maze systems and/or maze paradigms, automated maze systems can enable complex cognitive tasks or physiological variables to be measured for neuropsychological endophenotyping and biomarker based modeling. Further, by connecting the doors with other apparati, a wide array of further measurements can be automated (e.g. automatic scoring of gait www.mousespecifics.com); or other complex choice paradigms such as consumer demand studies (which might involve choosing between cages of different temperatures, or between cages containing different potential mates).

The housing systems may further enable the movement, separation, and/or sorting of animals or mice for experimental or husbandry purposes. Thus, for example, one could automatically move mice to a new cage, or automatically (re)move certain individuals (e.g. weanlings). The doors or closing devices could redirect individual mice to holding or transport boxes for husbandry, veterinary, or experimental procedures. Alternatively, the doors could automatically sort animals (e.g. sorting weanlings by weight), or could allow multiple cages of animals to share a single expensive piece of apparatus (e.g. a treadmill).

Exemplary suppliers of animal housing materials and systems, including automated systems and devices, including but not limited to automated and non-automated housing supplies, feeders, response sensors, levers, one-way doors, and computer software for processes described herein include Coulbourn Instruments (Allentown, Pa.), Phidgets Inc. (Calgary, Alberta, Calif.), TSE Systems, Inc. (Midland, Mich.), Lafayette Instruments (Lafayette, Ind.), Med Associates (St. Albans, Vt.), NewBehavior AG (Zurich, Switzerland), Lab Products, Inc. (Seaford, Del.), Alternative Designs Manufacturing and Supply, Inc. (Siloam Springs, Ark.), and Bio-Serv (Frenchtown, N.J.).

Software and Interfacing

Interfacing can provided computer control by USB over each of the mechanical components. Each door's USB interface would provide daisy-chaining of power connections, USB connections, and additional input/output channels for driving sensors or stimuli in different modular stations.

For example, each turnstile or closing device may be served by a separate USB or LAN or wireless interface. The interface can allow daisy-chaining of power connections, and can provide a powered USB hub to daisy-chain USB between doors, and to provide connections for third-party USB-based equipment (e.g. cameras, scales, RFID readers, etc).

Power supply to the interface may utilize a voltage suitable for the interfacing electronics (e.g., 5V), and a second voltage compatible with commercial equipment (e.g. −28V). Event detection may be configured on the order of about 10 ms, so changes of state in digital inputs may be detected in the interface (e.g. like a phidgets DAQ interface); rather than driver-polling of the interface (i.e. not like a measurements computing DAQ interface), which would overwhelm a USB connection.

The interface may provide control and DAQ for components in the ceiling and floor of the assembly (e.g. locking solenoid, loudspeaker, etc) and the 4 modular stations attached to each compartment within the rotatable turnstile. The interface can provide 3 or more analog outputs to drive an optical signals (such as an RGB & UV composite), which may be duplicated at each station, and enabled at each location by a separate digital line. The interface can provide locking control, and position sensing for the turnstile at each position. The interface can also provide control for a sound generator, tone generator, and/or waveform playback. Each interface can also contain an oscillator coupled with Phase Locked Loop detection circuits, so that IR LED/Phototransistor pairs can be used for beam-break detection. In addition, each interface can have a manual thumbwheel, DIP switch, or equivalent, on the case which will allow the user to set an ID# for the door in the apparatus. Separate passive infrared sensors aligned with each station position can detect the current location of the small animal or mouse, using for example, a phidgets PIR sensor (analog) or a digital sensor (or the analog signal conditioned to a digital input).

A single connector on the interface can carry all signals to and from the turnstile, while separate connectors on the interface can carry signals to and from each station connected to the turnstile.

Signal conditioning in the interface may duplicate the input and output signal lines for each station at two connectors. The first, with limited functionality, may be directly compatible with Coulbourn equipment (www.coulbourn.com) or another manufacturer; the second may be a universal connector for the action station modules or functionalities described herein. Some station modules, such as the feeder station, may use or require both connectors.

Some lines may be available on both connectors. In the case of inputs, these may be combines as a simple OR (alternatively, these could all be separate inputs if necessary). In the case of the second connector, the digital inputs may be duplicated as a straightforward TTL, and also as an input into a PLL, so that the input line can be used with TTL devices, or with IR beam breaks driven by the onboard oscillator (provided in the connector as IR LED power).

A preferred design may include Phidgets boards (www.phidgets.com) #1012 (16 digital in, 16 digital out, TTL to 30V) and either #1019 (8 TTL in, 8 TTL out, 8 analog in, 6 port USB hub, USB interface) or #1070 (8 TTL in, 8 TTL out, 8 analog in, 6 port USB hub, microcontroller, with Ethernet interface or USB). Combining these boards with a multiplexing D/A converter, standard PLL circuitry and other simple signal conditioning can provide the functionality of [[0091-0097].

The driver in the controlling computer can provide straight thru-port control of the output lines in the interface, on-request reading of the input lines, and change-of-state event generation on a 10 ms timescale. Implementation of this driver functionality requires an appropriate selection of interface boards. Many boards require a driver to poll the board repeatedly, which is undesirable for at least two reasons: 1) polling rate has to decrease with the number of devices being polled to stay within the bandwidth of a USB or network connection and some boards become 'backed up' if the bandwidth is exceeded, both of these lead to an inherent variable and unpredictable discrepancy between the actual time an event occurs and when it is detected; 2) system timers in windows are inaccurate, compounding this inaccuracy. On-board event detection minimizes these issues, where the board contacts the controlling computer only when an event occurs in the outside world (such as a beam break) or when asked for data by the controlling computer. Therefore the interface will comprise of either event generating DAQ boards (e.g. Phidgets boards); or a single board computer (SBC) or microcontroller that controls subservient DAQ boards, and raises events and sends and receives data and instructions to/from the controlling computer.

An object model can provide contextual control over the physical I/O ports represented by the driver, contextual reporting of data inputs, and raise contextually meaningful events. For example, ".locked" and ".unlocked" methods might provide control over the locking solenoid on the door. Further, a ".position" property might report the position of the turnstile, and an "indexed" event might be raised once the door is rotated and locked in register with the action stations.

Within the object model a "Turnstile" object will represent each physical turnstile, providing properties, methods and events that pertain to the physical turnstile itself. The Turnstile object can be parent to a "Stations" collection, containing four "Station" objects. Each station object can provide generic organizational information (such as its physical position in the door) generic control over its input and output lines (e.g. a ".DigitalInput1" property), and pass events to the parent door object to raise.

In addition, specific classes of station object can be built for each kind of station module to provide additional contextual control. For example, a "FeederStation" object might provide a "DispenseRewards" method that executes the required number of timed digital pulses to deliver the requested number of food pellets, and a "RewardCollected" event that reports when a animal, such as a mouse, pokes its head into the feed hopper. Objects may also provide a GUI, where user interaction is passed directly to the interface or the controlling program.

Software may be preferably designed to ensure computer control of the various system components, including flexibility to accommodate newly available commercial devices, including sensors and other measurement devices added to the system. Accordingly, a database application may provide a preferred software approach, since it can allow rapid configurability and can provide a more universally open and easily portable framework, providing the largest potential compatibility with commercial products, through for example, general purpose database connectivities, such as ODBC and SQL. A database application may also provides a means to integrate high-level data from multiple sources, including for example, algorithms run in dedicated separate software packages on the same computer, which can be gathered and collated by the database application. Furthermore, in some applications, it may be desirable to examine the current status of a turnstile (e.g., one configured to measure weight and feed and water intake) and a summary of recent activity remotely through a web-based interface; or for the software to raise alerts (e.g., if a particular animal has not eaten in a 24 h period, or has lost a certain % of body weight) by email, phone, SMS, or other electronic means.

Rotatable Turnstile Assembly

In one aspect, the present invention provides a rotatable turnstile assembly as described above. Preferably, the rotating door assembly is incorporated in an animal home cage system through which small animals, such as mice may pass to gather food. As the turnstile turns, it creates 'chambers' which can hold the mouse in a "station" facilitating automation of a wide variety of behavioral and physiological measurements, stimuli presentation, or automatic drug administration animals. The doors constitute a rotating turnstile that can be locked in any one of four positions. Each corresponding position can have different modular units, functionalities, or "stations" slotted into the walls (e.g., entry/exit, RFID readers, doorways, etc.). The various parts of each door may be configured to slot into the base of the assembly.

In one embodiment, the rotating door assembly includes a turnstile containing a plurality of rotatable doors connecting to one another and/or configured to form a central shaft. Base (or floor) and top (or ceiling) portions are connected to terminal ends of the central shaft. In addition, a housing portion laterally extends around the turnstile, further joining the base and top to the turnstile to form a turnstile enclosure module. Either one of the base, ceiling or both may be configured to provide a pivot for the turnstile rotating about the shaft. Adjacent doors in the turnstile form partitions creating a plurality of isolation chambers. The rotating turnstile can be locked to temporarily maintain an animal's position in any one of the chambers or stations. Each isolation chamber may include a "station" as further described above.

In one embodiment, the base provides a pivot for the turnstile, guides for the walls, stations, and guides for connection to other assemblies, or other equipment that needs to be held in registration to the base. The roof of the assembly may house a one-way (freewheel) clutch that allows the turnstile to turn in only one direction, as well as visual and auditory stimuli, and parts which register the position and lock the turnstile. Thus, an index/lock wheel fits onto the turnstile shaft, and is engaged by a solenoid to lock the door, at the same time, the wheel's position is read by an IR beam, allowing the door to be locked in precisely the correct position to create a "chamber" in front of each station. The design of the turnstile is critical to the proper functioning of the door—clearance between the walls, ceiling, and floor, ensure that the tail of the mouse does not get caught, the swept back ends of the turnstile block access to the action stations when the turnstile has not fully rotated into position, and the shaft is square (or indexed in another manner) to ensure that the turnstile always stays in register with the index/lock wheel.

Rotatable Turnstile

In another aspect, the present invention provides a rotatable turnstile 110 for high throughput animal experiments. The rotatable turnstile 110 contains one or more separation members 114 connected to each other or to a shaft 118, the separation members 114 and/or shaft 118 being rotatable about a vertical axis. The separation members 114 extend radially outward substantially the same distance, each separation member terminating at a distal end 115. In addition, the separation members 114 have top and bottom 126, 127 boundaries relative to a vertical axis, such that when the separation members 114 are rotated, the distal ends 115 define a cylindrical surface whereby separation members 114 bounded by a plane defined by the top boundary 126 of the separation members 114 and by a plane defined by the bottom boundary 127 of the separation members 114 define a three dimensional space sized to enclose a single rodent, but to exclude additional rodents or a single human adult.

In one embodiment, the separation members 114 are connected to a shaft 118 rotatable about a vertical axis. The three dimensional space may be bounded on the horizontal axis by a unitary longitudinal separation member in the form of a vane 114 or door or by a plurality of separation members 114 in the form of bars, rods, or combination thereof. Further, the turnstile 110 may include a plurality of vanes 114 rotatable about a vertical axis, whereby each vane 114 comprises a curved distal end portion 116. Further, the distal ends 115 or curved distal end portions 116 may be configured so that upon rotation of the turnstile 110, the curved distal ends 115 or curved distal end portions 116 define a cylindrical three dimensional space. In one embodiment, the turnstile comprises three or more vanes 114. In another embodiment, the turnstile comprises four vanes 114. The vanes 114 may be formed from plastic or other materials suitable for convenient snap-together construction.

Methods for Conducting Animal Experiments

In one embodiment, a method for conducting a high throughput animal experiment includes providing a housing system 100 (as described above) having a plurality of passageways 104 configured to allow experimental animals 106 to exit from and return back to a home cage 102. The passageways 104 include at least one rotatable turnstile 110 with a plurality of separation members 114 configured to provide a plurality of lockable isolation chambers 117 connected to the passageways. The passageways or turnstile 110 include at least one identification station, the passageways being configured so that a small animal must pass through at least one rotatable turnstile before returning to the home cage. The housing system 100 is populated with a plurality of experimental animals 106. The system includes a means for identifying animals 106 exiting from a home cage 102 through one or more passageways 104 and entering into the rotatable turnstile 110. The test animal 106 may be identified before leaving the home cage 102 (as described above) or it may be identified upon entry into a passageway extending from the home cage 102 or upon entry into an isolation chamber 117 in the rotatable turnstile 110. In conjunction with its identification, the test animal 106 is allowed to proceed through the rotatable turnstile 110 (and optionally one or more additional rotatable turnstiles), whereupon passage through one or more rotatable turnstile (s), the animal passes through additional action stations 112 configured to provide, promote, and/or execute one or more animal-directed or experimenter-initiated actions under manual control, or preferably under computer control based on the identification of the test animal, including actions serving to: provide food, provide drink, provide medication(s), provide potentially toxic test substance(s), provide a reward, provide a punishment, execute a physiological measurement, generate a photographic, videographic, thermographic, or fluorescent image of the test animal, subject the test animal to one or more stimuli, or combination thereof.

Execution of this method ensures that an animal exiting a home cage in a predetermined tunnel passageway sequence is specifically identified in an animal identification station sufficiently configured to allow linkage of subsequent animal actions or tasks to that animal using an automated 24 hour a day living environment allowing animals to unwittingly participate in experiments during normally active time periods in which they are motivated to execute normal tasks and behaviors, such as foraging, including "working" for their food and other resources, while generating behavioral and/or other experimental test data during their daily routine.

The systems and methods described herein are particularly suited for animals with relatively poor vision and hearing, such as mice. When used in the systems and methods described herein, mice and other small animals can facilitate high-throughput testing involving between 80 to about 160 tests per day (for the average mouse), especially when providing small food rewards and short test cycles between about 10 to about 20 minutes, which can be regulated by programming access to one or more one-way doors under a pre-determined time sequence. The one-way doors may restrict access by being locked for a pre-determined time (for example, 15 minutes unlocked and then 15 minutes locked). Because mice have small stomachs, they can only eat small amounts of food at a time. Therefore, high-throughput testing may require limiting the food rewards to between about 0.015 and about 0.025 grams at a time, for example. This provides motivation for the mice to perform repeated tests, which serve to generate a significantly increased amount of test data relative to manual or automated systems conventionally used in the art.

Individual animals may gain access to a maze through a series of "sessions" or "tests" where the maze is activated.

Sessions can be programmed to start and end on a schedule, and also on a range of other events. Each trip through a maze may be termed a "trial." On any given trial, particular stimuli may be presented, particular doors locked or unlocked, and rewards (and/or punishments) may be received with varying delays, probabilities, or sizes, depending on the choices made. An underlying database can maintain a log of input/output events as they are received or sent to the doors or stations, whereby every event can be stamped with a sequential order, and a timestamp (to at least 10 ms).

Any given experiment may include one or more 'tasks" or learning problems given to the mouse. 'Actions" or "tasks" may constitute a fundamental plug-in for maze software. Each action or task may include one or more "stages," which have to be completed in turn, and may be completed once a certain number of trials have been completed, once the animal has collected a certain number of rewards, or made certain number of correct choices (either consecutive, or in a row), or once a certain amount of time has elapsed. Each stage contains particular stimulus-response-reward "contingencies" that are chosen in a pseudo-random order based on the mouse's prior decisions, or the prior contingencies presented. Each contingency includes a stimulus (e.g. lights in the maze, or other stimuli devices attached to the apparatus, which doors are unlocked), a response (the rule governing the correct response, which may be tied to previous trials, or to which door the animal enters through in a Y-maze), and a reward (which may be tied to whether the mouse chose correctly, or to which choice it made). The organization of sessions (e.g. their timing, etc) may be defined by the action or task.

Individual animals may be assigned to particular tasks, and the order in which they perform each task may be controlled. To facilitate repeated measurement experiments (e.g. when the same task is repeated before and after a lesion) it must be possible to assign the same task or stages to the animal more than once, and maintain the corresponding data independently. Once data is collected, the tasks also contain information on how it should be processed and summarized, first for each stage, and then for each task.

In another embodiment, a method for conducting a high throughput animal experiment includes exposing an animal to a housing system containing a rotatable turnstile assembly and a compound tactile stimulus presentation device. At least one pre-determined compound tactile stimulus is presented to the animal, whereby the stimulus indicates one or more locations that may or may not contain an accessible reward, punishment, or neither. Conditions suitable for enabling the animal to receive the reward, punishment, or neither, depending on the animal's response to the compound stimulus are provided. These steps are repeated, altering the compound tactile stimulus as appropriate until a suitable number of tests (or cycles of the above steps) have been obtained in accordance with the underlying behavioral test or behavioral paradigm(s) which are being investigated in accordance the methodologies known to those of skill in the art. Alternatively, the conditions suitable for enabling receipt of the reward, punishment, or neither, may depend on the animal's response to multiple independent compound tactile stimuli presented concurrently, sequentially, or combination thereof, from a plurality of compound tactile stimulus devices set up in one cycle of steps, which may be repeated until a suitable number of cycles have been obtained as deemed by those of skill in the art.

In another embodiment, a method for testing an animal includes initiating a test by placing an animal in a home cage containing a first rotatable turnstile leading to a choice compartment containing a compound tactile stimulus presentation device according to the present invention. The compound tactile stimulus presentation device is positioned between a second rotatable turnstile in a second compartment and a third rotatable turnstile in a third compartment, whereby each of the rotatable turnstiles includes an identification station, and one or both of the second and third rotatable turnstiles includes a reward, punishment, or neither. The animal enters through the first rotatable turnstile into the choice compartment where the animal is exposed to the device presenting a pre-determined compound tactile stimulus indicating the location(s) of accessible reward(s) or punishments(s) in the second rotatable turnstile, the third rotatable turnstile, or both. The animal is identified in the first rotatable turnstile, investigates the stimulus, and chooses whether to enter the second or third rotatable turnstiles. Upon entry into either of the second or third rotatable turnstiles and receiving a punishment, reward, or neither, the animal is allowed to exit through the second or third rotatable turnstile and return to the home cage. Upon return to the home cage, the animal can repeat the above steps multiple times, whereupon in each case the compound tactile stimulus may remain the same or it may be changed. Similarly the rotatable turnstile containing the reward, punishment, or neither may remain the same or it may be changed, depending on the compound tactile stimulus. Preferred animal test methods include a step for determining whether a compound stimulus has been investigated by an animal. This may involve the use of infra-red beams as described above.

EXAMPLES

Proof of Concept Data

Figure 18:
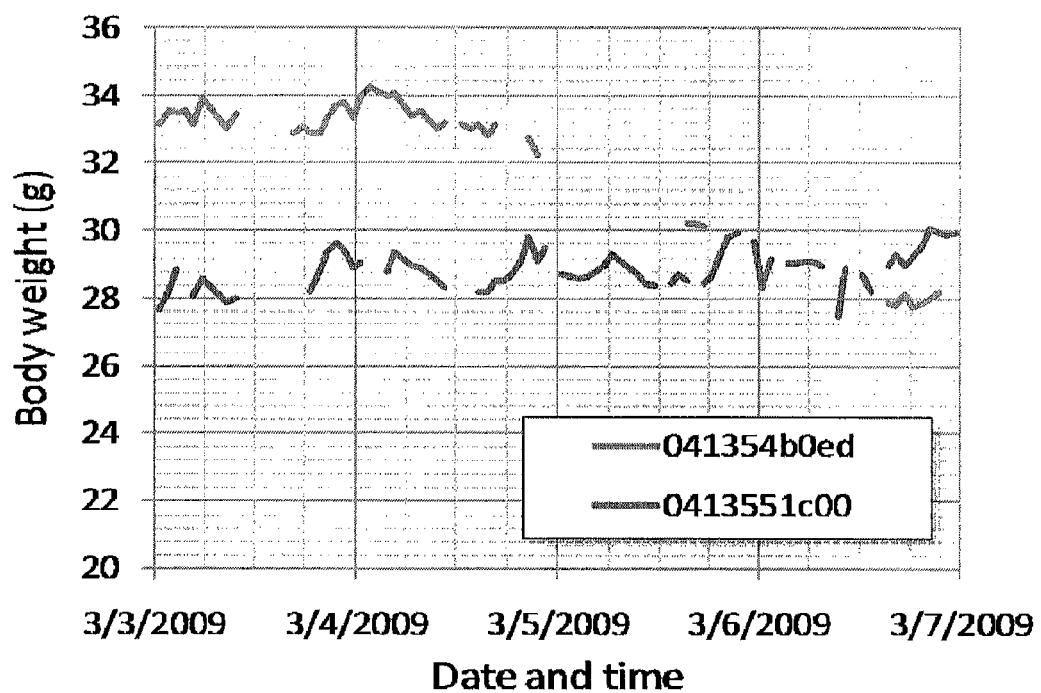
FIG. 18 depicts the results of a mouse experiment conducted in accordance with the present invention.

Using the housing system depicted in FIG. 15, mice were injected with either saline (mouse 0413551c00) or a compound known to induce a sickness response (mouse 041354b0ed). Mice were weighed whenever they collected feed and were identified by an RFID tag. The results are shown in FIG. 18. Note the normal diurnal rhythm in body weight, and the breaks in feeding behavior, whereby the device was able to detect the onset of both sickness and recovery almost immediately.

While various embodiments of the invention have been described, it will be apparent to those of ordinary skill in the art that many more embodiments and implementations are possible that are within the scope of the invention.

REFERENCES

1. Andrews, N., File, S. E., 1993. Handling history of rats modified behavioural effects of drugs in the elevated plus-maze test of anxiety. Eur J Pharmacol. 235(1), 109-112.
2. Augustsson, H., van de Weerd, H. A., Kruitwagen, C., Baumans, V., 2003. Effect of enrichment on variation and results in the light/dark test. Lab Anim. 37(4), 328-340.
3. Bayne, K., 2005. Potential for Unintended Consequences of Environmental Enrichment for Laboratory Animals and Research Results. ILAR Journal. 46(2), 129-139.
4. Chesler, E. J., Wilson, S. G., Lariviere, W. R., Rodriguez-Zas, S. L., Mogil, J. S., 2002. Identification and ranking of genetic and laboratory environment factors influencing a behavioral trait, thermal nociception, via computational analysis of a large data archive. Neurosci Biobehav R. 26(8), 907-923.

5. Chou-Green, J. M., Holscher, T. D., Dallman, M. F., Akana, S. F., 2003. Repeated stress in young and old 5-HT2C receptor knockout mice. Physiol Behav. 79(2), 217.
6. Davis, J., 1989. The microstructure of ingestive behavior. Ann. N. Y. Acad. Sci. 575, 106-119.
7. Gariepy, J.-L., Rodriguiz, R. M., Jones, B. C., 2002. Handling, genetic and housing effects on the mouse stress system, dopamine function, and behavior. Pharmacology Biochemistry and Behavior. 73(1), 7.
8. Garner, J. P., 2005. Stereotypies and other Abnormal Repetitive Behaviors: potential impact on validity, reliability, and replicability of scientific outcomes. ILAR Journal. 46(2), 106-117.
9. Hale, K. D., Weigent, D. A., Gauthier, D. K., Hiramoto, R. N., Ghanta, V. K., 2003. Cytokine and hormone profiles in mice subjected to handling combined with rectal temperature measurement stress and handling only stress. Life Sci. 72(13), 1495.
10. Hurst, J. L., Barnard, C. J., Tolladay, U., Nevison, C. M., West, C. D., 1999. Housing and welfare in laboratory rats: Effects of cage stocking density and behavioural predictors of welfare. Anim Behav. 58(3), 563-586.
11. Kissileff, H. R., 2000. Ingestive behavior microstructure, basic mechanisms and clinical applications. Neuroscience & Biobehavioral Reviews. 24(2), 171.
12. Latham, N., Mason, G., 2004. From house mouse to mouse house: the behavioural biology of free-living *Mus musculus* and its implications for laboratory housing. Appl Anim Behav Sci. 86(3-4), 261-289.
13. Moberg, G. P., Mench, J. A., 2000. The biology of animal stress: basic principles and implications for animal welfare, Wallingford, UK; New York, N.Y., CABI Pub.
14. Moons, C. P. H., Van Wiele, P., Odberg, F. O., 2004. To enrich or not to enrich: Providing shelter does not complicate handling of laboratory mice. Contemp Top Lab Anim. 43(4), 18-21.
15. Olsson, A., Dahlborn, K., 2002. Improving housing conditions for laboratory mice: a review of 'environmental enrichment'. Lab Anim. 36(3), 243-270.
16. Perello, M., Chacon, F., Cardinali, D. P., Esquifino, A. I., Spinedi, E., 2006. Effect of social isolation on 24-h pattern of stress hormones and leptin in rats. Life Sci. 78(16), 1857.
17. Ravussin, E., Bouchard, C., 2000. Human genomics and obesity: finding appropriate drug targets. Eur J Pharmacol. 410(2-3), 131.
18. Ryabinin, A. E., Wang, Y.-M., Finn, D. A., 1999. Different Levels of Fos Immunoreactivity After Repeated Handling and Injection Stress in Two Inbred Strains of Mice. Pharmacology Biochemistry and Behavior. 63(1), 143.
19. Sherwin, C., 2002. Comfortable quarters for mice in research institutions. In: Reinhardt, V., Reinhardt, A., Comfortable Quarters for Laboratory Animals. Animal Welfare Institute, Washington, D.C.
20. Smith, G., 2000. The controls of eating: brain meanings of food stimuli. Prog Brain Res. 122, 173-186.
21. Sternberg, W. F., Ridgway, C. G., 2003. Effects of gestational stress and neonatal handling on pain, analgesia, and stress behavior of adult mice. Physiol Behav. 78(3), 375.
22. Strubbe, J. H., Woods, S. C., 2004. The Timing of Meals. Psychol. Rev. 111(1), 128.
23. Weiss, J. M., 1971. Effects of Coping Behavior with and Without A Feedback Signal on Stress Pathology in Rats. Journal of Comparative & Physiological Psychology. Vol. 77(1), 22-30.
24. Wolfer, D. P., Litvin, O., Morf, S., Nitsch, R. M., Lipp, H.-P., Würbel, H., 2004. Cage enrichment and mouse behaviour. Nature. 432, 821-822.
25. Würbel, H., 2000. Behaviour and the standardization fallacy. Nat. Genet. 26(3), 263.
26. Würbel, H., 2001. Ideal homes? Housing effects on rodent brain and behaviour. Trends Neurosci. 24(4), 207-211.

The invention claimed is:

1. A housing system for conducting high throughput animal experiments comprising:
   a home cage sized to house a plurality of animals;
   at least one rotatable turnstile enclosed by a turnstile housing to form two or more isolation chambers;
   one or more action stations functionally linked to one or more of said isolation chambers;
   wherein the turnstile comprises one or more separation members rotatable about a vertical axis, each of said isolation chambers being bounded by at least two of said separation members and a portion of the turnstile housing, each of said isolation chambers being sized to accommodate only a single animal;
   wherein at least one of the one or more action stations comprises a device facilitating completion of an animal-directed or experimenter-initiated action, and
   wherein the turnstile housing comprises a base, walls, and a ceiling, each of the base and ceiling being connectively linked to the turnstile and the walls, the walls laterally extending around the turnstile to form one or more open regions configured for connective engagement to the one or more action stations, rotatable turnstiles, or tunnel passageways.

2. The system of claim 1, further comprising guides attached to the base, the walls, and the ceiling, wherein the guides are grooved so as to facilitate slotted attachment to the one or more action stations, and wherein the guides comprise ledges facilitating slidable attachment to the base.

3. The system of claim 1, further comprising means to attach the one or more action stations to the base, the walls, and the ceiling.

4. The system of claim 1, further comprising means to lock the turnstile in register with one of said isolation chambers so as to facilitate lockable engagement between any one of the isolation chambers and the one or more action stations.

5. The system of claim 1, further comprising means to ensure unidirectional rotation of the turnstile, wherein the means to ensure unidirectional rotation comprises motorized control of the shaft of the doors, motor, stepper motor, servo, solenoid driven ratchet, freewheel clutch, or other motorized device.

6. The system of claim 5, wherein means to ensure unidirectional rotation of the turnstile comprises a freewheel clutch.

7. The assembly of claim 1, wherein when the turnstile is partially rotated and out of register, the animal cannot move from one of said isolation chambers to another of said isolation chambers.

8. The assembly of claim 1, wherein when the turnstile is in register, the animal can move from one of said isolation chambers to another of said isolation chambers.

9. The assembly of claim 1, wherein the ceiling comprises means for identifying the rotational position of the turnstile.

10. The system of claim 1, wherein each of said separation members comprises a curved distal end portion which extends in a single circumferential direction such that upon rotation of the turnstile, the curved distal end portions of the turnstile define a circle.

11. The system of claim 10, wherein the curved distal end portions of the turnstile curve in a direction opposite a rotation direction of the turnstile.

12. The system of claim 1, wherein the base comprises a floating floor configured to allow weight measurements.

13. The system of claim 1, wherein the turnstile housing is connected to more than one tunnel passageway.

14. The system of claim 1, wherein at least one of the action stations comprises a feed hopper.

15. The system of claim 1, wherein at least one of the action stations comprises a tactile stimulus device comprising a plurality of overlapping stimulus presentation members.

* * * * *